United States Patent
Ryu et al.

(10) Patent No.: US 9,351,616 B2
(45) Date of Patent: May 31, 2016

(54) APPARATUS FOR CLEANING A GLASS WINDOW AND METHOD FOR CONTROLLING THE MOVEMENT THEREOF

(75) Inventors: Man Hyun Ryu, Gyeongbuk (KR); Kwang Mok Jung, Gyeongbuk (KR); Young Ho Choi, Gyeongbuk (KR)

(73) Assignees: INTELLECTUAL DISCOVERY CO., LTD., Seoul (KR); KOREA INSTITUTE OF ROBOT & CONVERGENCE, Pohang-Si (KR)

( * ) Notice: Subject to any disclaimer, the term of this patent is extended or adjusted under 35 U.S.C. 154(b) by 200 days.

(21) Appl. No.: 13/698,206

(22) PCT Filed: May 13, 2011

(86) PCT No.: PCT/KR2011/003563
§ 371 (c)(1),
(2), (4) Date: Nov. 15, 2012

(87) PCT Pub. No.: WO2011/145840
PCT Pub. Date: Nov. 24, 2011

(65) Prior Publication Data
US 2013/0060380 A1 Mar. 7, 2013

(30) Foreign Application Priority Data

May 15, 2010 (KR) .......................... 10-2010-0045718

(51) Int. Cl.
*G05B 19/18* (2006.01)
*G05B 19/04* (2006.01)
(Continued)

(52) U.S. Cl.
CPC ................ *A47L 1/03* (2013.01); *G05D 1/0011* (2013.01); *G05D 1/027* (2013.01); *G05D 1/0219* (2013.01);
(Continued)

(58) Field of Classification Search
CPC ............... A47L 1/03; A47L 1/02; A47L 1/12; G05D 1/0227; G05D 1/0219; G05D 2201/0203; B25J 9/0003
USPC .......... 701/245, 254, 258; 901/1; 15/102, 103
See application file for complete search history.

(56) References Cited

U.S. PATENT DOCUMENTS 1,490,616 A * 4/1924 Lundquist ................. A47L 1/03
15/250.24
1,603,175 A * 10/1926 Weisz ....................... A47L 1/12
15/103

(Continued)

FOREIGN PATENT DOCUMENTS

DE 19928869 A1 1/2001
EP 1554966 A2 7/2005
(Continued)

OTHER PUBLICATIONS

International Search Report for PCT/KR2011/003563, English translation attached to original, Both completed by the Korean Patent Office on Jan. 12, 2012, All together 4 Pages.

*Primary Examiner* — Khoi Tran
*Assistant Examiner* — Jorge Peche
(74) *Attorney, Agent, or Firm* — Sughrue Mion, PLLC

(57) ABSTRACT

A window cleaning apparatus includes a first cleaning unit and a second cleaning unit that is attached to both sides of a window, respectively, by a magnetic force and moved on the sides, and a method of controlling a movement of the window cleaning apparatus. The method includes detecting the first initial attachment position of the window cleaning apparatus and moving the window cleaning apparatus close to the detected initial attachment position after cleaning.

16 Claims, 18 Drawing Sheets

(51) Int. Cl.
*A47L 1/03* (2006.01)
*G05D 1/00* (2006.01)
*G05D 1/02* (2006.01)

(52) U.S. Cl.
CPC ............ G05D 1/0227 (2013.01); G05D 1/0272 (2013.01); *A47L 2201/04* (2013.01); *G05D 2201/0203* (2013.01)

(56) References Cited

U.S. PATENT DOCUMENTS

| | | | |
|---|---|---|---|
| 3,048,871 A * | 8/1962 | Presser | A47L 1/03 15/250.19 |
| 3,751,750 A * | 8/1973 | Kaftan | A47L 1/12 15/220.2 |
| 5,032,775 A * | 7/1991 | Mizuno | B08B 3/024 15/319 |
| 5,440,216 A * | 8/1995 | Kim | A47L 5/28 15/319 |
| 5,646,494 A * | 7/1997 | Han | A47L 11/4011 318/587 |
| 5,896,488 A * | 4/1999 | Jeong | G05D 1/0229 318/568.12 |
| 6,308,114 B1 | 10/2001 | Kim | |
| 6,574,536 B1 * | 6/2003 | Kawagoe | G05D 1/0033 15/319 |
| 8,457,789 B2 * | 6/2013 | Hong | A47L 9/009 15/3 |
| 8,826,482 B2 * | 9/2014 | Ryu | A47L 1/03 15/103 |
| 9,215,956 B2 * | 12/2015 | Ryu | A47L 1/03 |
| 2004/0158357 A1 * | 8/2004 | Lee | B60L 11/1833 700/258 |
| 2005/0015912 A1 * | 1/2005 | Kim | A47L 5/34 15/319 |
| 2006/0186561 A1 * | 8/2006 | Song | A47L 7/04 261/26 |
| 2008/0065347 A1 * | 3/2008 | Lavarec | G05D 1/0219 702/155 |
| 2008/0119961 A1 * | 5/2008 | Myeong | G05D 1/0274 700/262 |
| 2008/0133054 A1 * | 6/2008 | Kim | A47L 9/009 700/245 |
| 2008/0184518 A1 * | 8/2008 | Taylor | A47L 9/009 15/319 |
| 2010/0026239 A1 * | 2/2010 | Li | H02J 7/0044 320/109 |
| 2011/0226282 A1 | 9/2011 | Choi et al. | |
| 2013/0014782 A1 * | 1/2013 | Ryu | A47L 1/03 134/6 |
| 2013/0096717 A1 * | 4/2013 | Yoon | A47L 11/33 700/245 |
| 2014/0156076 A1 * | 6/2014 | Jeong | B25J 9/0003 700/257 |

FOREIGN PATENT DOCUMENTS

| | | | |
|---|---|---|---|
| JP | 07-023879 A | 1/1995 | |
| JP | 2000250452 | 9/2000 | |
| JP | 2001-128900 A | 5/2001 | |
| JP | 2002325708 A | 11/2002 | |
| JP | 2005192994 A | 7/2005 | |
| JP | 2007319485 A | 12/2007 | |
| JP | 2009219831 A | 10/2009 | |
| KR | 20010083059 A | 8/2001 | |
| KR | 100732567 B1 | 6/2007 | |
| KR | 2009017191 A | 2/2009 | |
| WO | 2006078921 A1 | 7/2006 | |
| WO | WO 2006078921 A1 * | 7/2006 | ........... A01K 61/003 |

* cited by examiner

APPARATUS FOR CLEANING A GLASS WINDOW AND METHOD FOR CONTROLLING THE MOVEMENT THEREOF

CROSS-REFERENCE TO RELATED APPLICATIONS

This application is the U.S. national phase of PCT Appln. No. PCT/KR2011/003563 filed May 13, 2011 which claims priority to Korean Application No. 10-10-0045718 filed May 15, 2010, the disclosures of which are incorporated in their entirety by reference herein.

BACKGROUND OF THE INVENTION

1. Field of the Invention

The present disclosure relates to a window cleaning apparatus.

2. Description of the Related Art

Windows installed on the walls of a building are easily polluted by external dust and pollutants, which may degrade their appearance and lighting performance. Therefore, it is preferable to frequently clean the windows installed on the walls of a building.

However, the outer side of the window is more difficult to clean than the inner side, and particularly, as higher buildings are increasingly constructed, cleaning the outer side of the windows may involve great risks.

SUMMARY OF THE INVENTION

The present invention has been made in an effort to provide a method of controlling a movement of a window cleaning apparatus which can improve the convenience of a user.

An embodiment of the present invention provides a method of controlling a movement of a window cleaning apparatus that is attached and moved on a window and the method includes: detecting the initial attachment position of the window cleaning apparatus; and moving the window cleaning apparatus close to the detected attachment position, in the left end the right end of the window.

An embodiment of the present invention provides a window cleaning apparatus that is attached and moved on a window and includes a first cleaning unit and a second cleaning unit that are respectively attached to the inner side and the outer side of a window by a magnetic force and moved on the sides, in which at least one of the first and second cleaning units includes a control unit that detects the initial attachment position of the window cleaning apparatus and moves the window cleaning apparatus close to the detected initial attachment position, after cleaning. The method of controlling a movement may be implemented by a computer-readable recording medium where a program for executing the method in a computer is recorded.

According to an exemplary embodiment of the present invention, a user can easily detach the window cleaning apparatus from a window, by moving the window cleaning apparatus close to the initial attachment position after cleaning.

In particular, when the window cleaning apparatus includes two cleaning units that are attached to the inner and outer sides of a window, respectively, by a magnetic force, it is possible to improve safety of the window cleaning apparatus by making it easy to detach the units on the inner and outer sides.

DETAILED DESCRIPTION OF THE PREFERRED EMBODIMENTS

Figure 1:
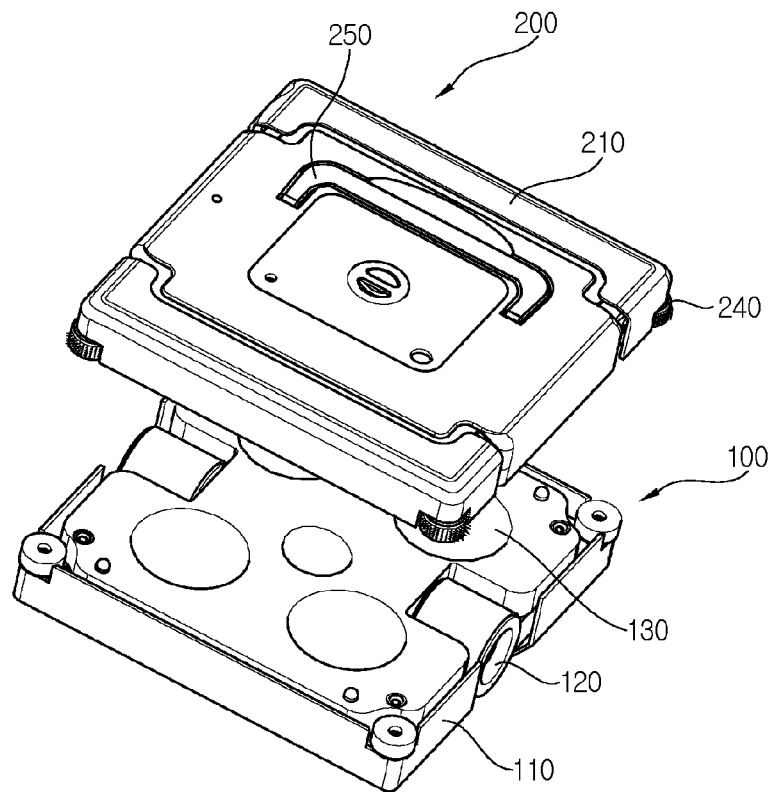
FIG. 1 is a perspective view briefly illustrating the configuration of a window cleaning apparatus according to an exemplary embodiment of the present invention.

A window cleaning apparatus according to an embodiment of the present invention and a method of controlling a movement of the window cleaning apparatus are described hereafter with reference to the FIGS. 1 to 26. The following exemplary embodiments may be modified in other ways and the scope of the exemplary embodiments is not limited to the exemplary embodiments described below. The exemplary embodiments are provided to more completely explain the present invention to those skilled in the art. Therefore, the shapes and sizes of the components in the drawings may be exaggerated for more clear explanation.

FIG. 1 is a perspective view briefly illustrating the configuration of a window cleaning apparatus according to an embodiment, the window cleaning illustrated in the figure may include two cleaning units 100 and 200, which are disposed on both sides of a window, respectively.

Referring to FIG. 1, the first cleaning unit 100 may be disposed on the inner side of a window and the second cleaning unit 200 may be disposed on the outer side of the window. In contrast, the first cleaning unit 100 may be disposed on the outer side of the window and the second cleaning unit 200 may be disposed on the inner side of the window.

The first and second cleaning units 100 and 200 may be attached opposite each other on both sides of the window, each using a magnetic module having magnetic force therein.

Further, when the first cleaning unit 100 is moved on the inner side of the window by an external or internal power source, the second cleaning unit 200 may be moved together with the first cleaning unit 100 by magnetic force between the magnetic modules of the first and second cleaning units 100 and 200.

The second cleaning unit 200 may be provided with an attachment/detachment member 250 to be easily attached/detached to/from a window, for example a handle 250, as illustrated in FIG. 1, and the first cleaning unit 100 may also be provided with an attachment/detachment member (not shown) corresponding to the attachment/detachment member 250 to be easily attached/detached.

Accordingly, a user can attach the window cleaning apparatus to a window, using the attachment/detachment members of the first and second cleaning units 100 and 200, that is, the handles, and detach the first and second cleaning units 100 and 200 from the window, using the handles after cleaning.

The window cleaning apparatus according to an exemplary embodiment of the present invention may further include a remote controller (not shown) for a user to control the operations of the first and second cleaning units 100 and 200.

As described above, the second cleaning unit 200 is passively moved by the magnetic force with the movement of the first cleaning unit 100 and a user can control the operation of a window cleaning apparatus composed of the first and second cleaning units 100 and 200 by controlling the movement of the first cleaning unit 100, using the remote controller.

Although a wireless type remote controller is exemplified in the exemplary embodiment for the convenience of a user, a wire type remote controller may be used or the window cleaning apparatus may be manually controlled by a user.

On the other hand, the window cleaning apparatus according to an exemplary embodiment of the present invention, in detail, the first cleaning unit 100 disposed on the inner side of a window may move along a predetermined movement path or may be equipped with a sensor (not shown), which detects dust, and move while determining a movement path that can improve cleaning efficiency.

Hereinafter, the first and second cleaning units 100 and 200 will be described in more detail with reference to FIGS. 2 and 3.

Figure 2:
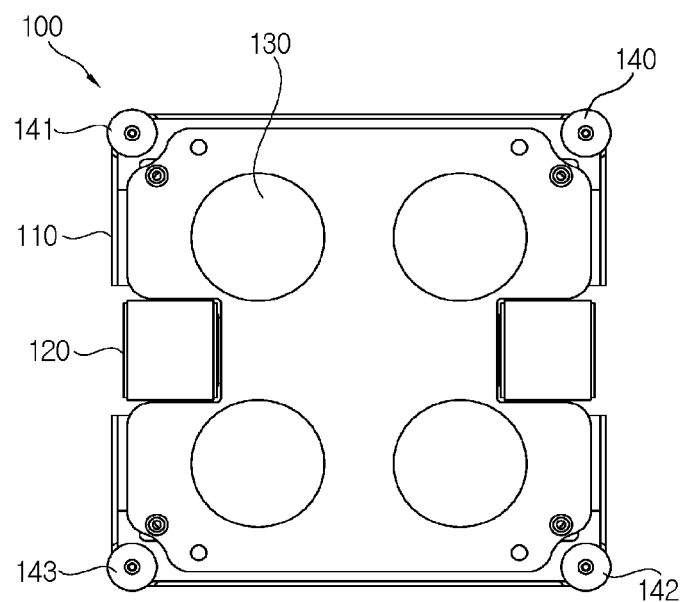
FIG. 2 is a plan view illustrating the configuration of a first cleaning unit disposed on the inner side of a window, according to an exemplary embodiment.

FIG. 2 is a plan view illustrating the configuration of the first cleaning unit 100, that is, the configuration of the top to be brought in contact with a window, in both sides of the first cleaning unit 100.

Referring to FIG. 2, the first cleaning unit 100 may include a first frame 110, a plurality of first wheel members 120, and a plurality of first magnetic modules 130.

The first frame 110 constitutes the body of the first cleaning unit 100, and the first wheel members 120 and the first magnetic modules 130 may be connected and fixed to the first frame 110.

Shock-absorbing members 140 to 143 may be disposed at the edge of the first frame 110 to minimize a shock when the window cleaning apparatus collides with a protruding structure such as the frame of a window while moving. Sensors (not shown) are connected to the buffer members 140 to 143, respectively, and when the sensors sense a shock, the first cleaning unit 100 can change the movement path.

For example, as illustrated in FIG. 2, the shock-absorbing members 140 to 143 may be disposed at four corners of the first cleaning unit 100, respectively, and the connected sensors (not shown) can recognize that the first cleaning unit 100 has collided with the frame of a window by sensing a shock.

In detail, while the window cleaning apparatus moves, when two shock-absorbing members 140 and 141 at one side of the first cleaning unit 100 sense a shock, it is recognized that the side with the shock-absorbing members 140 and 141 in the sides of the first cleaning unit 100 has collided with the frame of a window.

Although the first frame 110 of the first cleaning unit 100 has a rectangular cross-section in the exemplary embodiment, it does not limit the present invention, as an example, and may be implemented in various shapes such as a circular or polygonal cross-section.

The first cleaning unit 100 may include the first magnetic modules 130, which generate magnetic force such that the first and second cleaning units 100 and 200 can be attached to both sides of a window.

For example, the first magnetic modules 130 may include a permanent magnet such as a neodium magnet, such that the first magnetic modules 130 can generate magnetic force together with second magnetic modules 233 of the second cleaning unit 200.

In more detail, the first magnetic modules 130 of the first cleaning unit 100 may include a magnet having a pole opposite to that of a magnet of the second magnetic modules 233 provided to the second cleaning unit 200, so that the first and second cleaning units 100 and 200 disposed on both surfaces of a window can attract each other with magnetic force. Accordingly, the first and second cleaning units 100 and 200 can be attached to the window, and be moved together.

According to another exemplary embodiment of the present invention, the magnetic modules 130 and 233 may include electromagnets, not the permanent magnets, or may include permanent magnets and electromagnets, as another exemplary embodiment.

The window cleaning apparatus according to an exemplary embodiment of the present invention is not limited to the configuration including the first and second magnetic modules 130 and 233, and may include any configuration, provided that the first and second cleaning units 100 and 200 can be attached and moved on a window therebetween.

For example, one of the first and second cleaning units 100 and 200 may include a magnetic body such as a permanent magnet or an electromagnet and the other may include a metal body that can be attracted by magnetic force of the magnetic body.

As illustrated in FIG. 2, the first magnetic modules 130 may be implemented by four discs and may be disposed on the top, which is attached to a window, of the first cleaning unit 100.

The first magnetic modules 130 may be exposed toward the window, or may be disposed close to the top of the first cleaning unit 100 by specific cover members.

Further, two or more first wheel members 120 may be provided at the left and right sides of the first cleaning unit 100 to be partially exposed above the first frame 110, for example, as illustrated in FIG. 2, two wheel members may be disposed at the left and right sides of the first cleaning unit 100, respectively, or four wheel members may be disposed at the corners, respectively.

For example, the first wheel members 120 may be rotated by a driving unit (not shown) such as a motor disposed inside the first frame 110. The first cleaning unit 100 can be moved in a predetermined direction on a window by the rotation of the first wheel members 120.

The first cleaning unit 100 may not only move straight, but move along a curve, that is, may change the movement direction. For example, it is possible to change the movement direction of the first cleaning unit 100 by changing the rotational axes of the first wheel members 120 or rotating the two first wheel members 120 at the left and right sides, respectively, at different speeds.

The surfaces of the first wheel members 120 may be made of, for example, fabric or rubber to generate predetermined frictional force against a window in rotating, and accordingly, the first cleaning unit 100 can easily move on the inner side of a window without idling. Further, the surfaces of the first wheel members 120 may be made of a material that does not scratch a window in rotating.

When the first cleaning unit 100 is attached to a of a window by magnetic force of the first magnetic modules 130, reaction force perpendicular to the window may be applied to the first wheel members 120. Therefore, as the first wheel members 120 are rotated by the driving unit such as a motor, the first cleaning unit 100 can be moved on the inner side of a window by frictional force.

Further, as the first cleaning unit 100 is moved by the rotation of the first wheel members 120, the second cleaning unit 200 attached to the opposite side, that is, the outer side of the window, can clean the window while moved together with the first cleaning unit 100 by the magnetic force.

Figure 3:
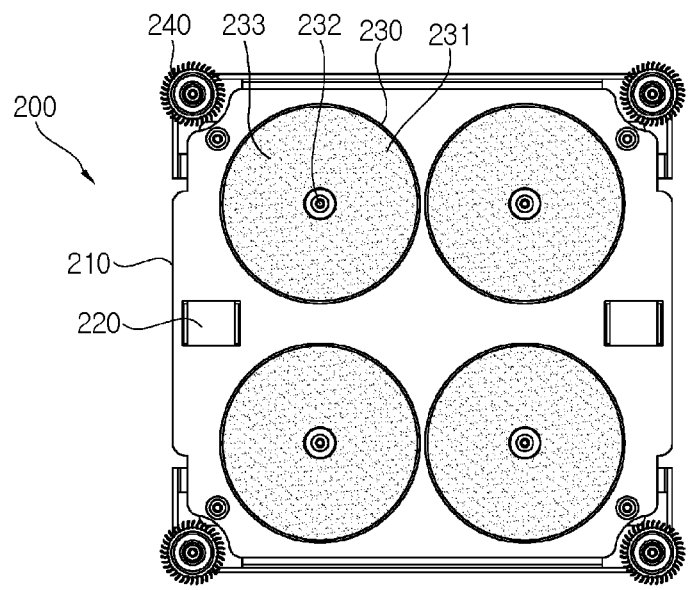
FIG. 3 is a plan view illustrating the configuration of a second cleaning unit disposed on the outer side of a window, according to an exemplary embodiment.

FIG. 3 is a plan view illustrating the configuration of the second cleaning unit 200 according to an exemplary embodiment, that is, the configuration of the bottom to be brought in contact with a window, in both sides of the second cleaning unit 200.

Referring to FIG. 3, the second cleaning unit 200 may include a second frame 210, a plurality of second wheel members 220, and a plurality of cleaning modules 230.

The second frame 210 may constitute a body of the second cleaning unit 200 and may be implemented in a plate structure having a shape corresponding to that of the first frame 110 described above, for example, a rectangular cross-section.

Further, the second wheel members 220 are disposed on the bottom of the second frame 210 such that the second cleaning unit 200 can be moved by magnetic force with the movement of the first cleaning unit 100.

According to an exemplary embodiment, unlike the first wheel members 120, the second wheel members 220 may be connected not to a driving unit such as a motor, but to the second frame 210 by shafts to smoothly rotate with the movement of the second cleaning member 200

Accordingly, when the second cleaning unit 200 is moved together with the first cleaning unit 100 by magnetic force, the second wheel members 220 may perform function similar to that of a bearing, by rotating.

Although the second wheel members 220 are formed a cylindrical shape in FIG. 3, the present invention is not limited thereto, and for example, the second wheel members 220 may be implemented by a spherical member such as a ball bearing.

The cleaning modules 230 are disposed on the bottom of the second frame 210 to be exposed to the outside, such that they can clean a side of a window, for example, the outer side where the second cleaning unit 200 is attached.

As illustrated in FIG. 3, each of the cleaning modules 230 may include a plurality of modules, for example, a cleaning pad 231, a second magnetic module 232, and a detergent ejection port 232, and may be implemented by four discs corresponding to the first magnetic modules 130 of the first cleaning unit 100.

Each of the four discs of the cleaning modules 230 may be rotated by a driving unit (not shown) such as a motor (not shown). Further, the cleaning modules 230 may protrude from a bottom surface of the second frame 210, at a predetermined distance, such that when attached to a window, the second cleaning unit 200 can clean the outer side of the window, using frictional force due to rotation of the cleaning modules 230.

A pad 231 made of fabric or rubber may be attached to the exposed surface of the cleaning module 230 such that foreign materials can be easily removed from the window by the frictional force in rotating. In this case, the pad 231 may be made of a material having a micro tip structure or porous structure to improve cleaning performance of the window cleaning apparatus.

Further, the cleaning module 230 may have the detergent ejection port 232 for ejecting a detergent, and for example, the detergent ejection port 232 may be connected with a detergent container (not shown) and a pump (not shown) in the second cleaning unit 200, through a specific channel to be supplied with a detergent. Therefore, when cleaning a window, the cleaning module 230 can clean the window while ejecting a detergent onto the window through the detergent ejection port 232.

The second magnetic module 233 may be disposed to overlap the inside of the cleaning module 230, that is, the bottom of the pad 231. The second magnetic module 233 has a shape corresponding to that of the first magnetic module 233 of the first cleaning unit 100 and generates magnetic force such that the first and second cleaning units 100 and 200 can be attached to both sides of a window.

The second magnetic module 233 may be implemented by a magnetic body or metal body such as a permanent magnet or an electromagnet, and accordingly, the first and second cleaning units 100 and 200 respectively on both sides of a window can be attached and moved on the window by being attracted to each other by the magnetic force.

For example, the cleaning module 230 may be disposed to correspond to the first magnetic module 130, and the second magnetic module 233 implemented by a neodium magnet having a polarity opposite to that of the first magnetic module 130 may be disposed inside the cleaning module 230.

Therefore, not only the first and second cleaning units 100 and 200 can be attached to both sides of the window by the magnetic force between the first magnetic module 130 and the second magnetic module 233 of the cleaning module 230, but the first and second cleaning units 100 and 200 can be integrally moved.

Further, a force is continuously applied, toward the window, to the cleaning module 230 by the magnetic force between the first and second magnetic modules 130 and 233 and the frictional force on the window correspondingly increases, when the cleaning module 230 rotates, such that the cleaning performance can be improved.

Referring to FIG. 3, a plurality of sub-cleaning modules 240 may be disposed at the corners of the second cleaning unit 200. Since the cleaning module 230 is disposed inside the second frame 210 and may be difficult to clean the edge of a window, the second cleaning unit 200 is provided with the sub-cleaning modules 240 to more easily clean the edge of the window.

The sub-cleaning modules 240 each include a roller member (not shown) which is rotatably installed and a brush may be disposed around the surface of the roller member. Therefore, the sub-cleaning modules 240 can remove foreign materials around the window frame while rotated by the frictional force against the window frame, when the second cleaning unit 200 moves along the window frame.

Further, the sub-cleaning modules 240 may perform the same function as that of the shock-absorbing members 140 of the first cleaning unit 100, that is, may minimize a shock and senses the shock, using a sensor provided therein, when the window cleaning apparatus collides with a protruding structure such as a window frame.

Although the configuration of the window cleaning apparatus according to an exemplary embodiment of the present invention was described above with reference to FIGS. 1 to 3, by exemplifying the window cleaning apparatus cleaning only one side of a window, for example, the outer side of a window, this is only an exemplary embodiment of the present invention and the present invention is not limited thereto.

For example, the first cleaning unit 100 may also be provided with the cleaning modules 230 of the second cleaning unit 200, and accordingly, the window cleaning apparatus may simultaneously clean both sides of a window.

According to an exemplary embodiment of the present invention, the window cleaning apparatus may return to a position where the user can easily detach the window cleaning apparatus, that is, a position close to the position where the window cleaning apparatus is initially attached, and stands by at the position.

For example, the initial attachment position of the window cleaning apparatus may be detected, when the user attaches the window cleaning apparatus to the window to clean the window, the window cleaning apparatus may move close to the detected attachment position, after cleaning, in the left end and the right end of the window, and accordingly, the user can easily detach the window cleaning apparatus, after cleaning.

Figure 4:
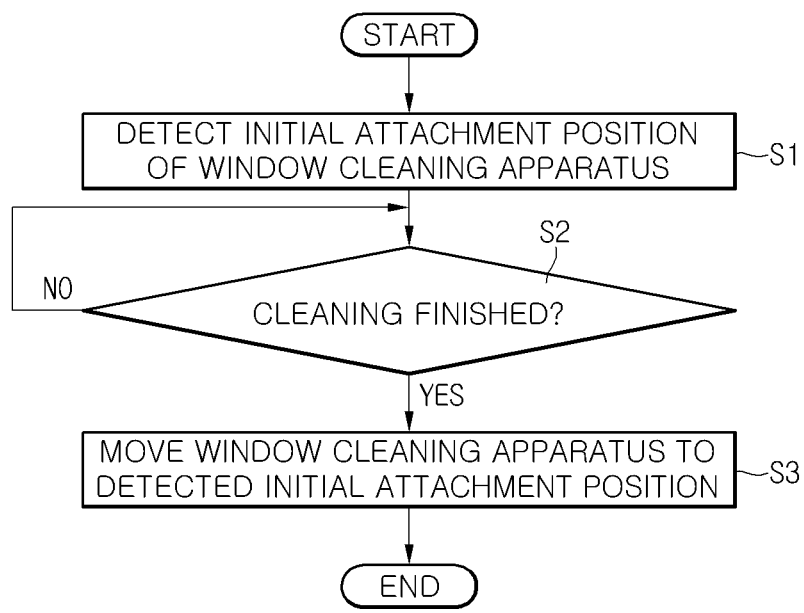
FIG. 4 is a flowchart illustrating a method of controlling a movement of a window cleaning apparatus, according to an exemplary embodiment.

FIG. 4 is a flowchart illustrating a method of controlling a movement of a window cleaning apparatus according to an exemplary embodiment of the present invention and the method of controlling a movement may be performed by at least one of the first cleaning unit 100 and the second cleaning unit 200 of the window cleaning apparatus.

For example, a control unit (not shown) that is disposed in the first cleaning unit, which is disposed on the inner side of a window and allows the window cleaning apparatus to move, in the first and second cleaning units 100 and 200 may perform the method of controlling a movement illustrated in FIG. 4.

Referring to FIG. 4, the control unit of the window cleaning apparatus detects the initial attachment position of the window cleaning apparatus (step S1).

For example, when a user requests starting of a cleaning operation after the window cleaning apparatus is attached to a window, the control unit may determine whether the initial attached position of the window cleaning apparatus is at a left or right side of the window.

Thereafter, the window cleaning apparatus performs the cleaning operation while being moved along a preset moving path.

The control unit determines whether the window finishes being cleaned (step S2), and moves the window cleaning apparatus close to the detected attachment position, in the left end and right end of the window, when finishing cleaning (step S3).

For example, when it is determined that the initial attachment position of the window cleaning apparatus is at the left side of the window in step S2, the control unit 310 may move the window cleaning apparatus to the left end of the window after cleaning.

In contrast, when it is determined that the initial attachment position of the window cleaning apparatus is at the right side of the window, the control unit 310 may move the window cleaning apparatus to the right end of the window after cleaning.

That is, since the position where the user attaches the window cleaning apparatus may be a position where the user may easily detach the window cleaning apparatus from the window, the window cleaning apparatus may return to the position close to the initial attached position, and be in a standby state, after cleaning, such that the user may easily detach the window cleaning apparatus from the window.

When the cleaning is not finished, the control unit 310 may keep moving the window cleaning apparatus along the movement path.

According to an exemplary embodiment, the window cleaning apparatus may be gradually moved from the top of the window to the lower end to clean the window, in which, when the window cleaning apparatus is moved down to the lower end of the window, the control unit 310 may determine that the cleaning is finished.

Hereinafter, the method of controlling a movement of the window cleaning apparatus 10 will now be described in more detail with reference to FIGS. 5 to 26.

It is exemplified in the following direction that the first cleaning unit 100 to be attached to the inner side of the window 400 in the first and second cleaning units 100 and 200 in the window cleaning apparatus 10, as described above, is moved by the method of controlling a movement according to an exemplary embodiment of the present invention.

Figure 5:
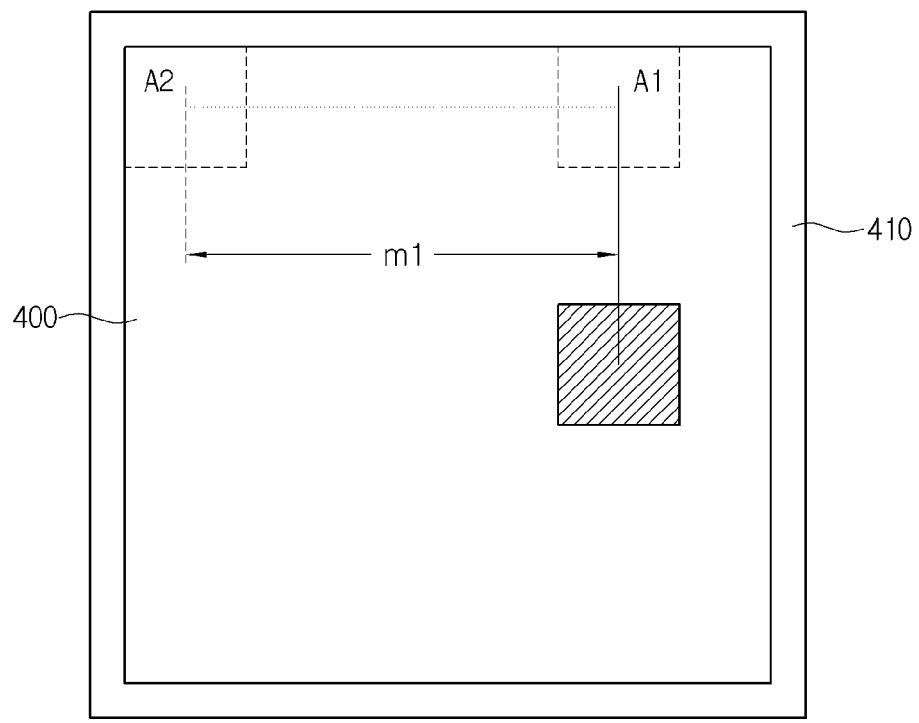
FIGS. 5 and 6 are views illustrating a first exemplary embodiment of a method of detecting the initial attachment position of a window cleaning apparatus.
Figure 6:
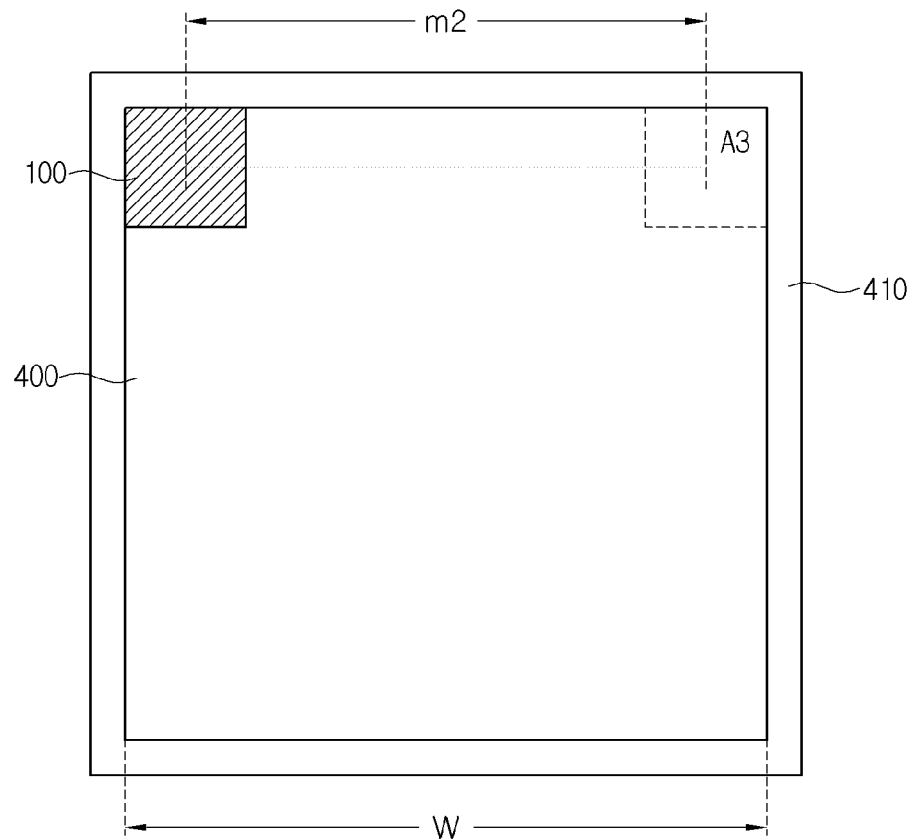

FIGS. 5 and 6 are views illustrating a first exemplary embodiment of a method of detecting the initial attachment position of a window cleaning apparatus.

Referring to FIG. 5, a frame 410 for fixing the window 400 may be disposed around the window 400, such that the window cleaning apparatus 10 may collide and come in contact with the frame 410 when moving to one side end of the window 410.

According to an exemplary embodiment of the present invention, when a user give an instruction to start cleaning after attaching the window cleaning apparatus 10 to the window 400, the window cleaning apparatus 10, in detail, the first cleaning unit 100 attached on the inner side of the window 400 moves up from the attached position.

For example, the first cleaning unit 100 can vertically move up to the top of the window from the attached position, and it is possible to determine that the first cleaning unit 100 has moved to the top of the window, when the shock-absorbing members of the first cleaning unit 100 collide and come in contact with the top of the frame 410.

In detail, when the upper shock-absorbing members collide with the frame 410 and pressure from the upper portion is sensed by the sensor while the first cleaning unit 100 vertically moves up, the first unit 100 may stop moving up.

Meanwhile, while the first cleaning unit 100 vertically moves up, the detergent is ejected through the detergent ejection port 231 of the second cleaning unit 200, such that the pads 231 of the cleaning modules 230 get wet.

Thereafter, the first cleaning unit 100 can horizontally move left to the right end of the window, and it is possible to determine that the first cleaning unit 100 has moved to the right end of the window, when the shock-absorbing members of the first cleaning unit 100 collide and come in contact with the right side of the frame 410.

In detail, when the shock-absorbing members collide and come contact with the frame 410 and pressure is sensed by the sensor while the first cleaning unit 100 horizontally moves left, the first unit 100 may stop moving left.

The first cleaning unit 100 can move to the top left side of the window 400 after attached by the user, by moving as described above.

Referring to FIG. 5, a first movement distance m1 may be measured while the first cleaning unit 100 horizontally moves left, and for example, the first movement distance m1 may be measured on the basis of the amount of rotation of the first wheel members 120 of the first cleaning unit 100.

Referring to FIG. 6, the first cleaning unit 100 can horizontally move right from the top left end to the top right end of the window 400, and it is possible to determine that the first cleaning unit 100 has moved to the right end of the window, when the shock-absorbing members of the first cleaning unit 100 collide and come in contact with the right side of the frame 410.

In detail, when the shock-absorbing members collide and come contact with the frame 410 and pressure is sensed by the sensor while the first cleaning unit 100 horizontally moves right, the first unit 100 may stop moving right.

As illustrated in FIG. 6, a second movement distance m2 may be measured while the first cleaning unit 100 is moved from the top left end to the top right end of the window 400, and for example, the second movement distance m2 may be measured on the basis of the amount of rotation of the first wheel members 120 of the first cleaning unit 100.

According to an exemplary embodiment of the present invention, after the first movement distance m1 and the second movement distance m2 are measured, the initial attachment position of the window cleaning apparatus can be found by comparing the first and second movement distances m1 and m2.

In the cases illustrated in FIGS. 5 and 6, since the first movement distance m1 is lager that a half the second movement distance m2, it may be determined that the initial attachment position of the window cleaning apparatus is at the right side on the window 400.

Therefore, after cleaning, the window cleaning apparatus, that is, the first cleaning unit 100 may move to and stay at the right end of the window 400, and accordingly, the user can easily detach the first and second cleaning units 100 and 200 from the window 400.

In contrast, when the first movement distance m1 is smaller than a half the second movement distance m2, it may be determined that the initial attachment position of the window cleaning apparatus is at the left side on the window 400, such that the first cleaning unit 100 may move to and stay at the left end of the window 400, after cleaning.

According to another exemplary embodiment of the present invention, the first cleaning unit 100 may move first by a third movement distance m3 to the right end of the window, after vertically moving up to the initial attachment position, and then may move by a fourth movement distance m4 by moving from the right end to the left end of the window.

In this case, when the third movement distance m3 is larger than a half the fourth movement distance m4, it may be determined that the initial attachment position of the window cleaning apparatus is at the left side on the window 400.

In contrast, when the third movement distance m3 is smaller than a half the fourth movement distance m4, it may be determined that the initial attachment position of the window cleaning apparatus is at the right side on the window 400.

Figure 7:
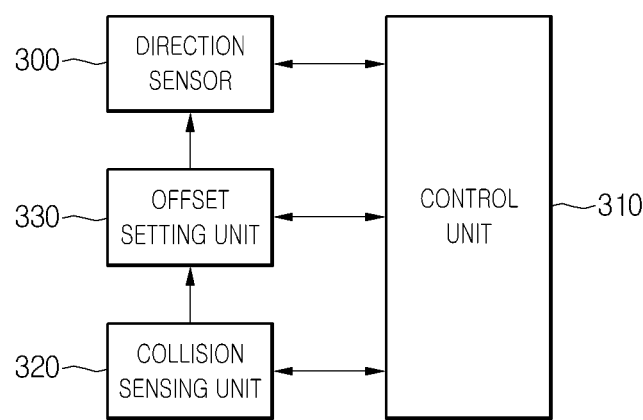
FIG. 7 is a block diagram briefly illustrating the configuration of a movement control device in a window cleaning apparatus, according to an exemplary embodiment.

FIG. 7 is a block diagram illustrating a movement control device of a window cleaning apparatus according to an exemplary embodiment of the present invention, in which the movement control device may include a direction sensor 300, a control unit 310, and a collision sensing unit 320.

Referring to FIG. 7, the direction sensor 300 can detect a movement direction of the window cleaning apparatus.

The direction sensor 300, a device that senses a physical change of the external environment and converts the change into an electric signal, senses physical quantities such as the inclination and acceleration of an object and converts the quantities into electric signals.

For example, the direction sensor 300 may be implemented by an acceleration sensor that senses acceleration of an object and converts the acceleration into an electric signal, and the acceleration sensor may a sensor using a piezo-resistor or capacitance.

In more detail, as for the acceleration sensor uses capacitance, in an acceleration motion, the position of an inner mass in the acceleration sensor changes, the overlap area of the mass and a sensing electrode is changed by the displacement of the inner mass, and the capacitance between the electrodes is changed by the change of the area, such that the acceleration can be measured by measuring the change of the capacitance.

The direction sensor 300 including the acceleration sensor can detect the movement direction of the window cleaning apparatus according to an exemplary embodiment of the present invention, about predetermined reference axes (e.g., a horizontal x axis and a vertical y axis).

The direction sensor 300 may be provided in at least one of the first and second cleaning units 100 and 200 described with reference to FIGS. 1 to 3, and according to an exemplary embodiment of the present invention, the direction sensor 300 may be provided in the first cleaning unit 100 that is attached to the inner side of a window and allows the window cleaning apparatus to move.

In this configuration, the direction sensor 300 disposed in the first cleaning unit 100 may detect the movement direction of the first cleaning unit 100, using the acceleration sensor described above.

Although a window cleaning apparatus according to an exemplary embodiment of the present invention was described above by exemplifying the direction sensor 300 detecting the movement direction of the window cleaning apparatus by using an acceleration sensor, the present invention is not limited thereto and various sensors that can recognize the movement direction of the window cleaning apparatus, other than the acceleration sensor, may be used.

The control unit 310 may control a movement of the window cleaning apparatus according to an exemplary embodiment of the present invention, on the basis of the movement direction of the window cleaning apparatus which is detected by the direction sensor 300.

For example, the control unit 310 may be disposed in the first cleaning unit 100 and control rotation of the first wheel members 120 described with reference to FIG. 2, and may include a driving unit (not shown) that operates the motors connected to the first wheel members 120, for the control.

In more detail, the control unit 310 may control the first cleaning unit 100 to move in a desired direction at a desired speed by adjusting the voltage (or current) supplied to the motors connected to the first wheel members 120, and the movement direction of the first cleaning unit 100 may be controlled on the basis of the movement direction of the window cleaning apparatus which is detected by the direction sensor 300.

That is, the control unit 310 may change the movement direction of the first cleaning unit 100 such that the movement direction of the window cleaning apparatus gets close to the desired direction, by comparing the desired direction with the present movement direction of the window cleaning apparatus which is detected by the direction sensor 300, and for this operation, the control unit 310 may periodically check the direction detected by the direction sensor 300.

The control unit 310 may include a circuit unit (not shown) that performs the function described above and the circuit unit may be may be implemented by PCB (Printed Circuit Board).

The collision sensing unit 320 can sense a collision of the window cleaning apparatus, and for this operation, the collision sensing unit 320 may include a plurality of shock sensors (not shown) that can sense a shock.

For example, the collision sensing unit 320 may be provided in the first cleaning unit 100 and sense that the first cleaning unit 100 collides with the frame of a window.

For this operation, the collision sensing unit 320 may include the shock-absorbing members 140 to 143 disposed at the corners of the first cleaning unit 100, as illustrated in FIG. 2, and the shock-absorbing members 140 to 143 may sense a shock due to collision with the frame of a window, using the shock sensors.

On the other hand, the control unit 310 may control the window cleaning apparatus 10 to move along the predetermined movement pattern, by controlling the movement direction of the window cleaning apparatus 10 which is detected by the direction sensor 300.

However, when a direction offset of the direction sensor 300 is not correctly set, that is, when the reference axes set in the direction sensor 300 does not coincide with the actual horizontal/vertical directions, the movement direction of the window cleaning apparatus 10 which is detected by the direction sensor 300 may not coincide with the actual direction.

In this case, the movement path of the window cleaning apparatus 10 controlled by the control unit 310 may not coincide with the predetermined movement path, which may deteriorate the cleaning performance or causes malfunction of the window cleaning apparatus 10.

The problems when the direction offset of the direction sensor is not correctly set are described in detail with reference to FIG. 8. The horizontal reference axis x' and the vertical reference axis y' set in the direction sensor 300 may not coincide with the actual horizontal axis x and a real vertical axis y, and the error in setting the direction offset may be caused by a model deviation of the direction sensor 300, a mechanical assembly difference, or a change in internal/external temperature.

For example, when the control unit 310 moves the window cleaning apparatus 10 horizontally to the right (in the direction of x axis), the window cleaning apparatus 10 moves actually slightly upward (the direction of x' axis) from the horizontal direction due to the error in setting the direction offset.

Figure 8:
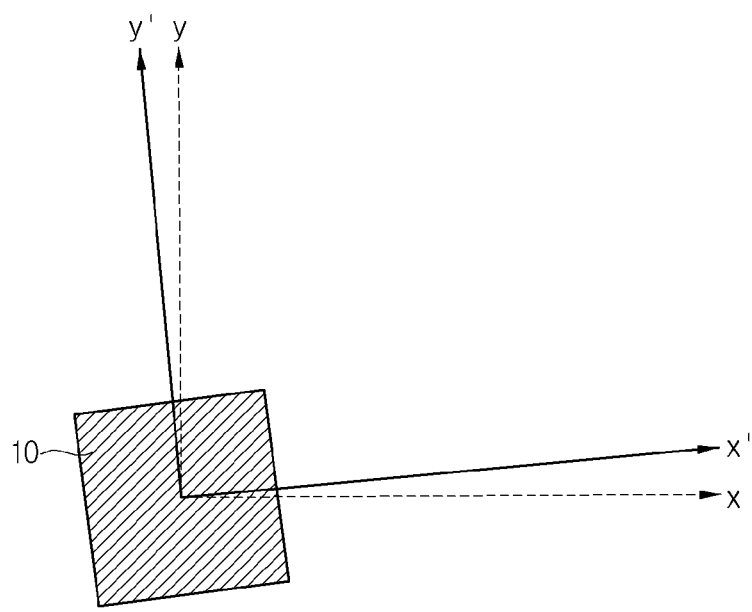
FIG. 8 is a view illustrating a method of setting a direction offset of a direction sensor in a window cleaning apparatus, according to an exemplary embodiment.

Therefore, it may be required to correctly set the direction offset of the direction sensor 300 (make the horizontal/vertical reference axes x' and y' coincide with the actual horizontal/vertical axes x and y illustrated in FIG. 8) in order to prevent the error in the movement direction due to the error in setting the direction offset of the direction sensor 300.

For this work, the window cleaning apparatus 10 according to an exemplary embodiment of the present invention may further includes an offset setting unit 330 that sets the direction offset of the direction sensor 300.

For example, when the window cleaning apparatus 10 collides with the frame of a window, the offset setting unit 330 may reset the direction offset of the direction sensor 300 in response to a signal inputted from the collision sensing unit 320.

In the movement paths for detecting the initial attachment position illustrated in FIGS. 5 and 6, the method of setting the offset of the direction sensor 300 may be performed, when the first cleaning unit 100 collides with the frame 410 (A1 and A2).

For example, the vertical offset of the direction sensor 300 may be reset, when the first cleaning unit 100 collides with the upper frame (A1) and the horizontal offset of the direction sensor 300 may be reset on the basis of the reset vertical offset.

That is, the horizontal offset may be reset by adjusting the horizontal reference axis x' illustrated in FIG. 8 to coincide with the actual horizontal axis x, and the vertical offset may be reset by adjusting the vertical reference axis y' of the direction sensor 300 to be perpendicular to the adjusted horizontal reference axis x'.

Further, the horizontal offset of the direction sensor may be reset, when the first cleaning unit 100 collides with the left side (A2).

On the other hand, the horizontal offset of the direction sensor 300 may be reset, when the first cleaning unit 100 collides with the right frame, and the vertical offset of the direction sensor 300 may be reset on the basis of the reset horizontal offset.

FIGS. 9-16 are views illustrating a second exemplary embodiment of a method of detecting the initial attachment position of a window cleaning.

Figure 9:
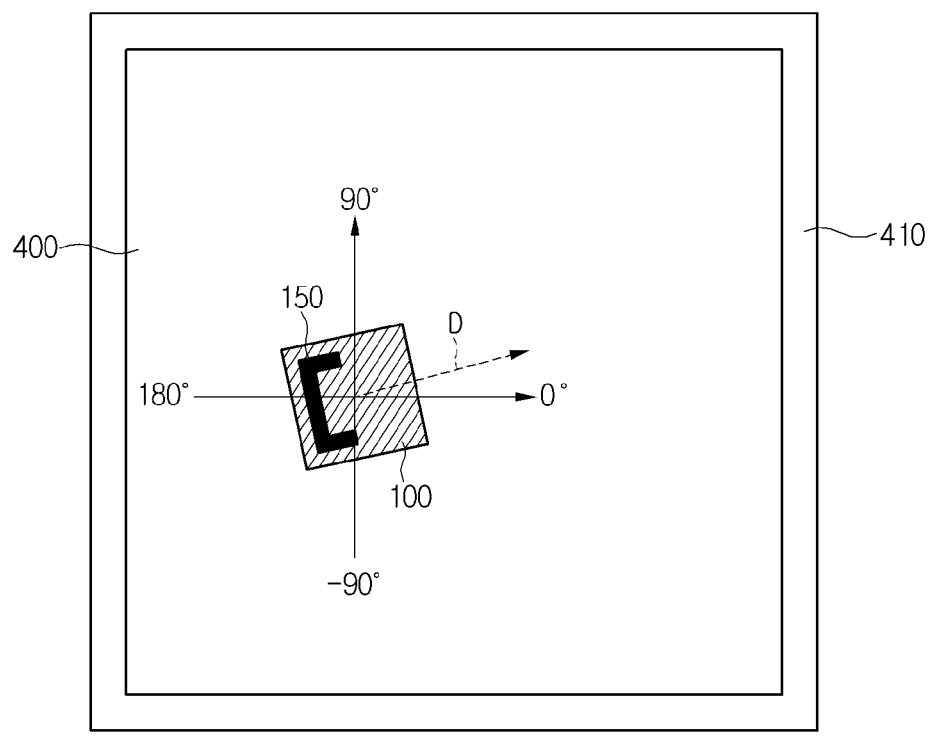
FIGS. 9-16 are views illustrating a second exemplary embodiment of a method of detecting the initial attachment position of a window cleaning.

Referring to FIG. 9, when the initial attachment direction D of the window cleaning apparatus is the right, that is, is close to 0° from an axis of 90°-(−90°), it may be determined that the window cleaning apparatus is attached to the left side of a window.

Figure 10:
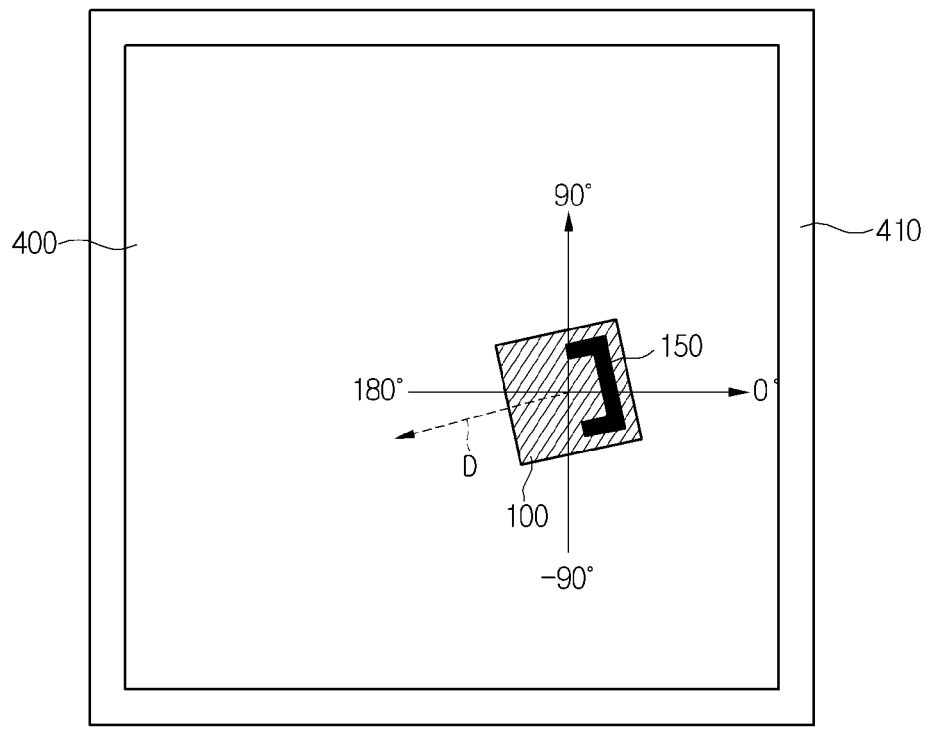

Referring to FIG. 10, when the initial attachment direction D of the window cleaning apparatus is the left, that is, is close to 180° from the axis of 90°-(−90°), it may be determined that the window cleaning apparatus is attached to the right side of the window.

When a user initially attaches the window cleaning apparatus to the window 400, an attachment/detachment member 150 as a handle provided to the first cleaning unit 100 is typically oriented to the frame 410 of the window 400. Thus, when it is assumed that the orientation of the attachment/detachment member 150 is opposite to the movement direction of the first cleaning unit 100, the initial attachment direction D of the window cleaning apparatus may be opposite to the attached position thereof.

For example, when a user attaches the window cleaning apparatus to the left side of the window 400 by using the attachment/detachment member 150, the attachment/detachment member 150 may be oriented to the left side, and the window cleaning apparatus may be oriented to the right side.

In this case, since the attachment direction of the window cleaning apparatus is close to 0°, the control unit 310 may determine that the window cleaning apparatus has been initially attached to the left side of the window 400.

In contrast, when the orientation of the attachment/detachment member 150 and the movement direction of the first cleaning unit 100 are the same in the window cleaning apparatus, it may be determined that the initial attachment direction D of the window cleaning apparatus is oriented to the side of the attachment position thereof.

That is, when the initial attachment direction D is close to 0°, it may be determined that the window cleaning apparatus has been initially attached to the right side of a window, and when the initial attachment direction D is close to 180°, it may be determined that the window cleaning apparatus has been initially attached to the left side of a window.

As described above, after the horizontal initial attachment position (that is, the left or right side) of the window cleaning apparatus is determined, the control unit 310 moves the window cleaning apparatus to the left or right determined as the horizontal initial attachment position.

Figure 11:
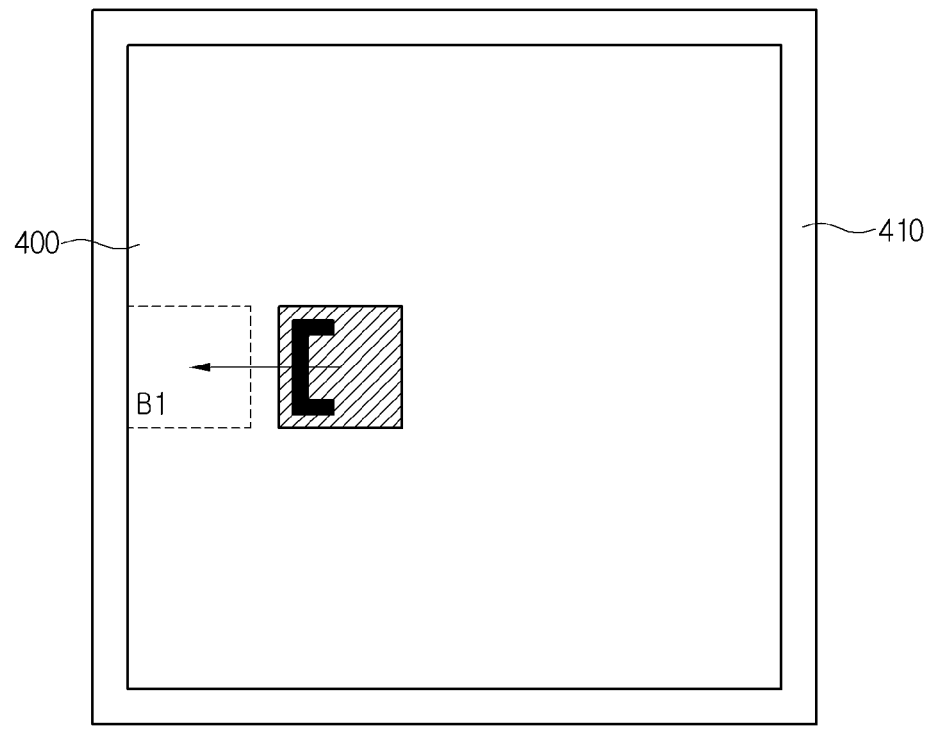

Referring to FIG. 11, when determining that the window cleaning apparatus has been initially attached to the left side of the window 400, the control unit 310 may move the first cleaning unit 100 to the left.

The first cleaning unit 100 that moves left may collide with the left vertical side of the frame 410 and the horizontal offset of the direction sensor 300 may be reset upon colliding with the left side (B1).

Figure 12:
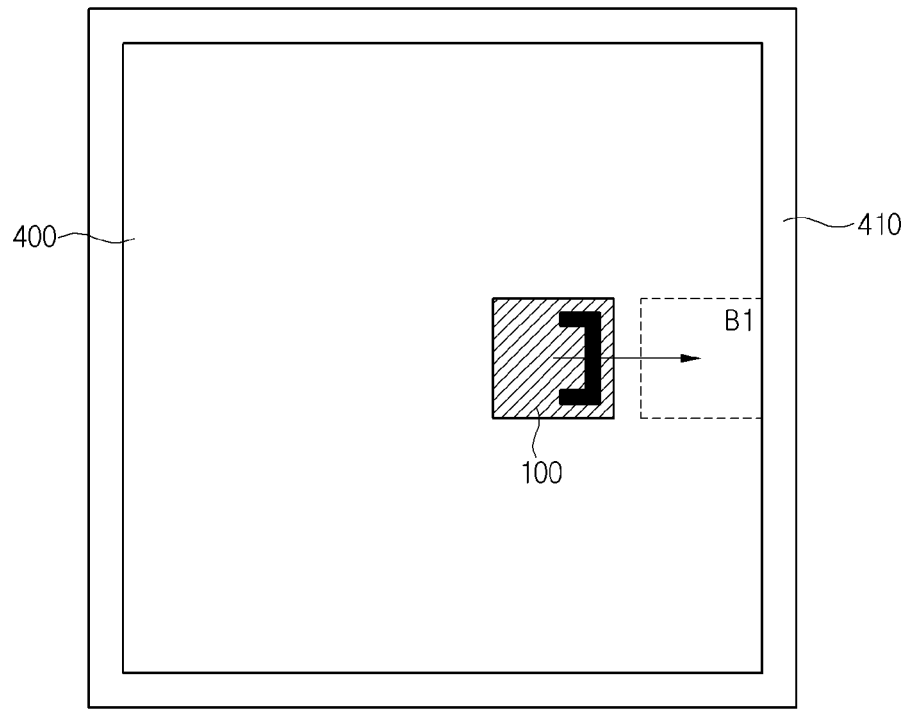

Referring to FIG. 12, when determining that the window cleaning apparatus has been initially attached to the right side of the window 400, the control unit 310 may move the first cleaning unit 100 to the right.

The first cleaning unit 100 that moves right may collides with the right vertical side of the frame 410 and the horizontal offset of the direction sensor 300 may be reset upon colliding with the right side (B1).

Figure 13:
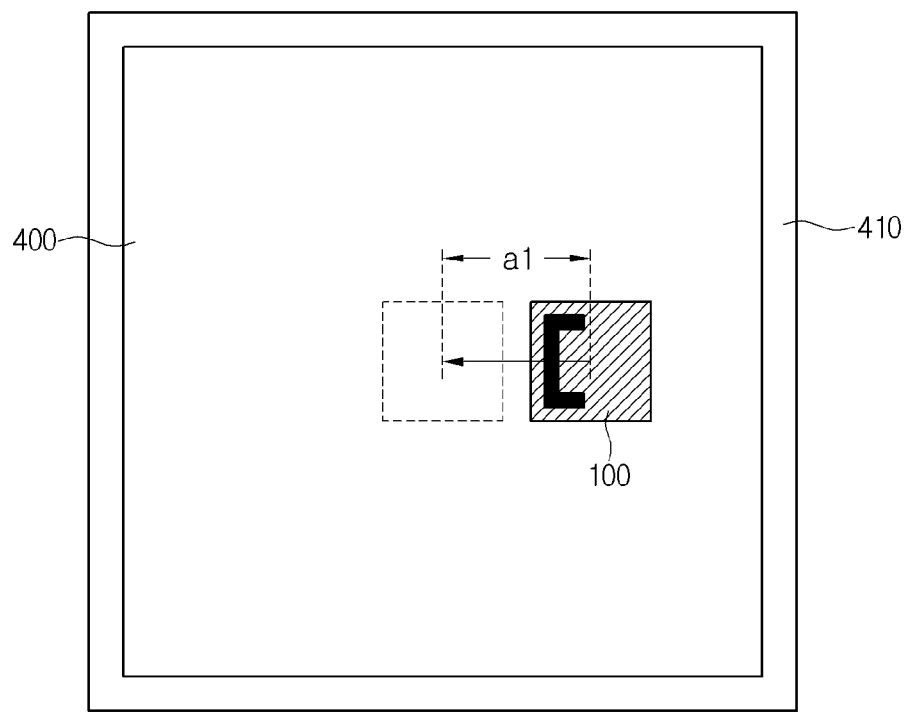

Referring to FIG. 13, when the control unit 310 determines that the initial attachment position of the window cleaning apparatus is at the left side on the window 400 and move the first cleaning unit 100 to the left, the first cleaning unit 100 may not collide with the left side of the frame 410 within a predetermined distance a1.

This is when the horizontal initial attachment position that is primarily estimated by the method described with reference to FIGS. 9 and 10 is incorrect, in which it may be determined that the initial attachment position of the window cleaning apparatus is at the right side, when the first cleaning nit 100 does not collide with the frame 410 while moving left by the predetermined distance d a1.

For example, assuming that the window cleaning apparatus is initially attached within about 50 cm from the right or left frame in consideration of the length of the user's arm, when the first cleaning unit 100 does not collide the frame 410 within about 50 cm from the right or left side while moving to a primarily determined side, the control unit 310 may determine that the horizontal initial attachment position of the window cleaning apparatus is opposite to the primarily determined position.

As illustrated in FIG. 13, when the first cleaning unit 100 does not collide with the frame 410 until moving left by the predetermined distance a1, the control unit 310 may change the movement direction of the first cleaning unit 100 in the opposite direction.

In this case, the horizontal initial attachment position of the window cleaning apparatus may be changed from the primarily estimated left to the right.

Figure 14:
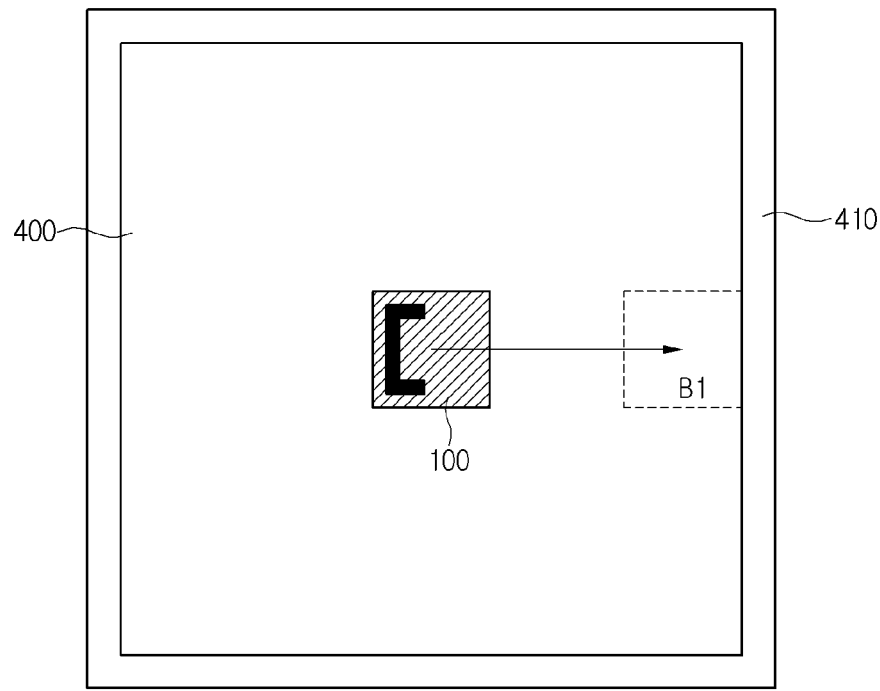

Referring to FIG. 14, the first cleaning unit 100 may move right and collides with the right vertical side of the frame 410 in accordance with the changed attachment position and the horizontal offset of the direction sensor 300 may be reset, when the first cleaning unit collides with the right side (B1).

Thereafter, the first cleaning unit 100 may change the movement direction and move to a predetermined distance a2, after moving left or right and colliding with the vertical side of the frame 410 in accordance with the initial attachment position that is determined (or re-determined) as described with reference to FIGS. 9 to 14.

Figure 15:
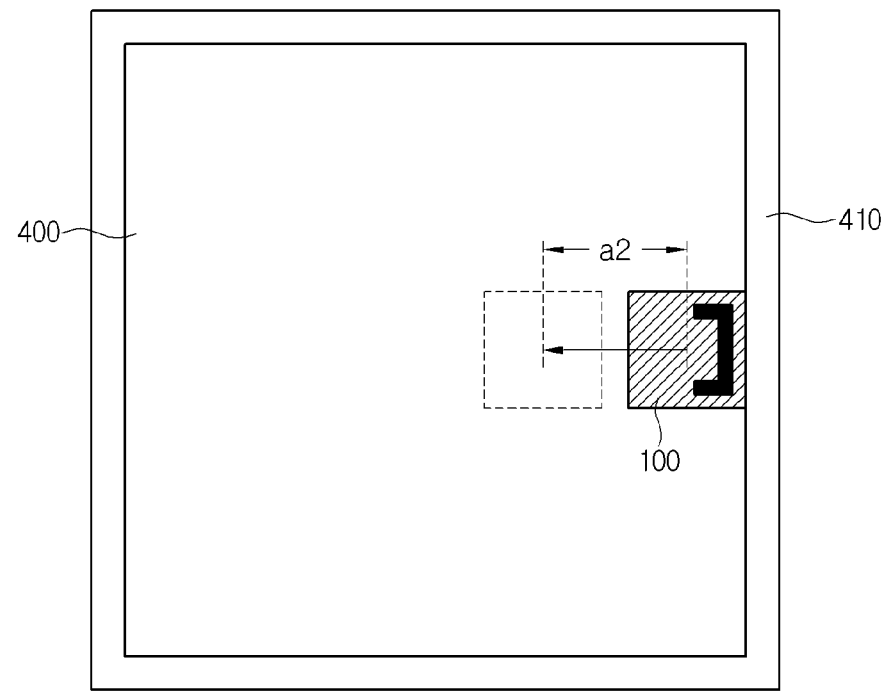

For example, as illustrated in FIG. 15, the first cleaning unit 100 may change the movement direction and horizontally move by the predetermined distance a2 corresponding to about 10 to 15 cm, after horizontally moving right and colliding with the right vertical side of the frame 410.

Figure 16:
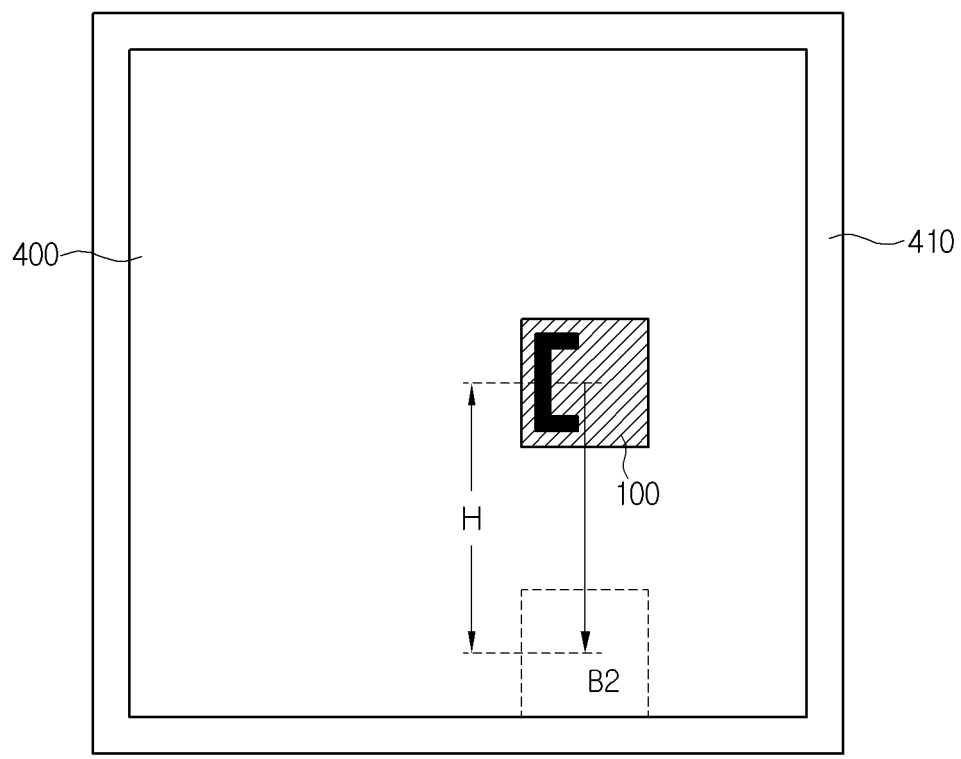

Referring to FIG. 16, thereafter, the first cleaning unit 100 may vertically move down to the bottom of the frame 410, after the movement direction is changed down.

The vertical movement distance H may be measured while the first cleaning unit 100 vertically moves down to the bottom of the frame, and for example, the vertical movement distance H may be measured by the amount of rotation of the first wheel members 120 of the first cleaning unit 100.

The measured vertical movement distance H may show a vertical initial attachment position of the window cleaning apparatus, and as the first cleaning unit 100 moves up and stands by at the distance H corresponding to the detected vertical initial attachment position, after cleaning, the window cleaning apparatus can be easily detached.

According to an exemplary embodiment of the present invention, the vertical offset of the direction sensor 300 may be reset, when the first cleaning unit 100 moves down and collides with the horizontal bottom side of the frame 410 (B2).

Figure 17:
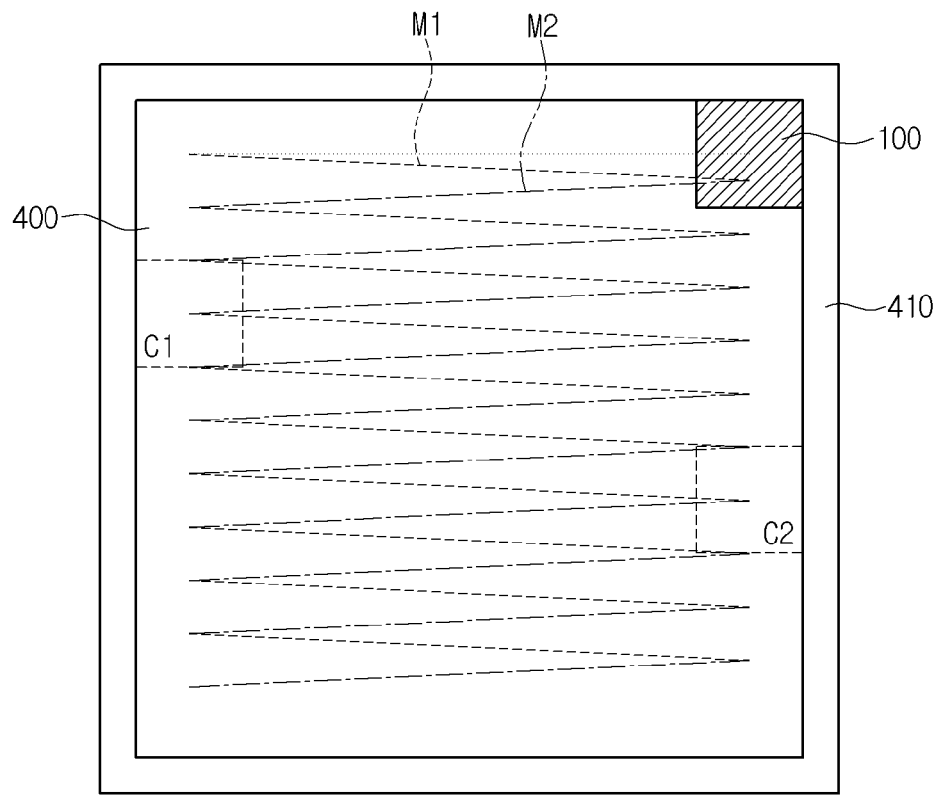
FIG. 17 is a view illustrating a movement path of a window cleaning apparatus, according to an exemplary embodiment of the present invention.

FIG. 17 illustrates an exemplary embodiment of the movement path of a window cleaning apparatus, that is, the path through which the window cleaning apparatus moves while cleaning a window.

Referring to FIG. 17, after the initial attachment position is detected, the first cleaning unit 100 may move to the top right end (or the top left end) of the window 400 and may clean the window while moving along a predetermined movement path from the top right end.

For example, the first cleaning unit 100 moves down to the right to the right end of the window 400 after moving to the top left end of the window 400, and then moves down to the left to the left end of the window 400.

That is, in the movement path of the first cleaning unit 100, a right-downward section M1 where the first cleaning unit moves down to the right and a left-downward section M2 where the first cleaning unit moves down to the left may be alternately repeated.

Further, the horizontal offset of the direction sensor 300 may be reset, when the first cleaning unit 100 that moves down to the left collides with the left vertical side of the frame 410 (C1).

Further, the horizontal offset of the direction sensor 300 may be reset, when the first cleaning unit 100 that moves down to the right collides with the right vertical side of the frame 410 (C2).

The horizontal offset of the direction sensor 300 may be reset whenever the first cleaning unit 100 moving along the movement path illustrated in FIG. 17 collides with the frame 410, or on the basis of a predetermined period T.

For example, when the period of resetting the direction offset is set to 100 seconds, the offset setting unit 330 counts time from when the direction offset of the direction sensor 300 is reset, and when the counted time reaches 100 seconds, the horizontal offset of the direction sensor 300 may be reset, when the first cleaning unit 100 collides with a window frame first after the 100 seconds.

According to an exemplary embodiment of the present invention, the movement path illustrated in FIG. 17 may be determined on the basis of the width of the window 400.

To this end, the control unit 310 measures the width of the window 400 over which the window cleaning apparatus moves left and right from the attachment position thereof to clean the window 400, and the movement path of the window cleaning apparatus may be varied in accordance with the measured width.

Figure 18:
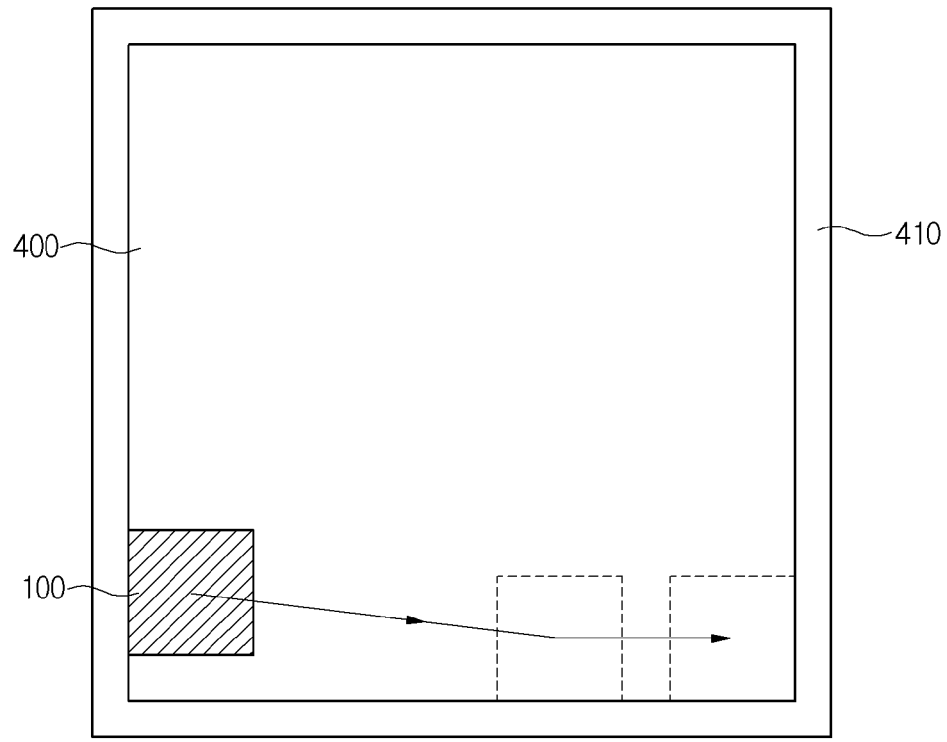
FIGS. 18 and 19 are views illustrating a method of finishing cleaning of a window cleaning apparatus, according to an exemplary embodiment.
Figure 19:
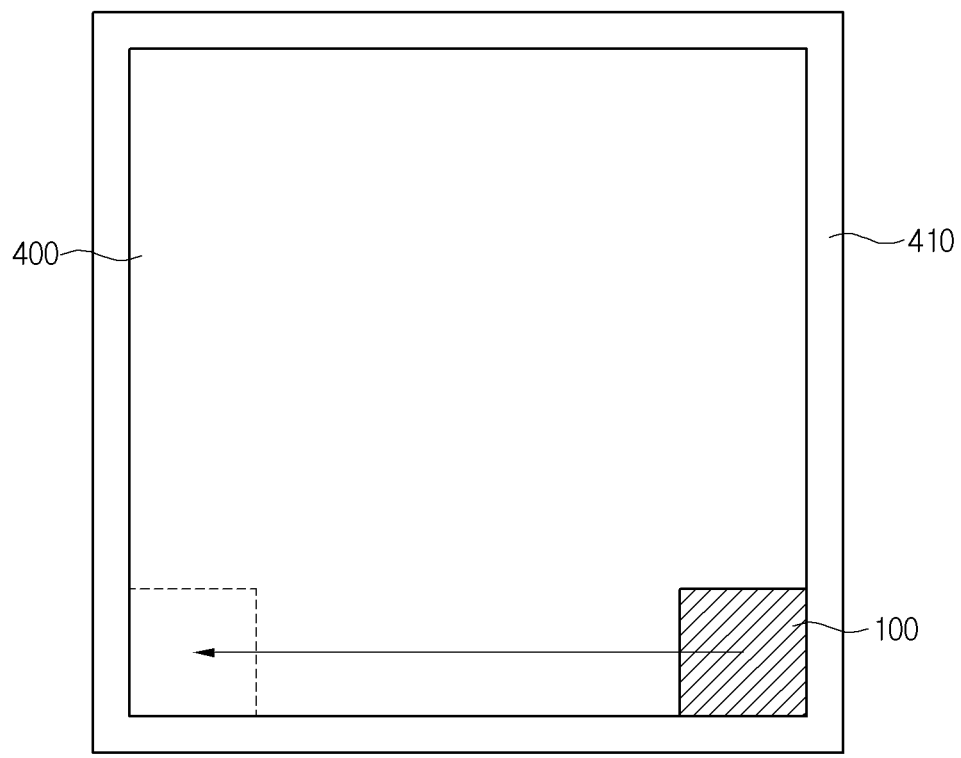

FIGS. 18 and 19 are views illustrating a method of finishing cleaning of a window cleaning apparatus, according to an exemplary embodiment.

Referring to FIG. 18, cleaning the window may be finished, when the first cleaning unit 100 reaches the lower end of the window 400 while moving down to the left and right along the movement path determined on the basis of the width w of the window 400, as described above.

For example, when the shock-absorbing members collide and come in contact with the bottom of the frame 410, with the first cleaning unit 100 moving down to the right, it may be determined that the first cleaning unit 100 has moved to the lower end of the window.

In detail, when the lower shock-absorbing members of the first cleaning unit 100 collides with the frame 410 and it is sensed by the sensor that pressure is applied from below for a predetermined time, it may be recognized to the time to finish cleaning.

When the first cleaning unit 100 has moved to the lower end of the window and the time to finish cleaning is recognized, the first cleaning unit 100 may horizontally move right along the bottom of the frame 410 to the right end of the window 400, and the detergent in the second cleaning unit 200 may be ejected, when the first cleaning unit 100 starts to horizontally move right.

Referring to FIG. 19, the first cleaning unit 100 may horizontally move left to the left end of the window 400 along the bottom of the frame 410, after moving to the right end of the window 400.

The detergent that may flow down during cleaning and remain on the lower end of the window 400 can be completely removed by the left and right horizontal movement of the first cleaning unit 100 after the detergent is ejected. When the window cleaning apparatus 10 finishes cleaning, the window cleaning apparatus 10, in detail, the first cleaning unit 100 may move to a position where the user can easily detach the first cleaning unit 100, for example, a position close to the initial attachment position.

Figure 20:
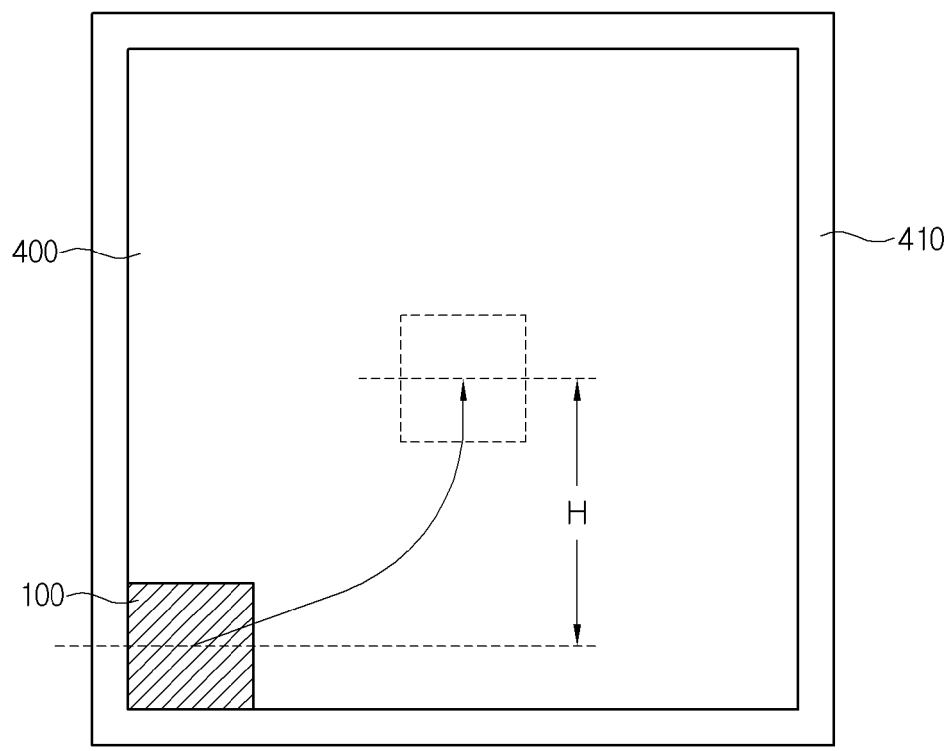
FIGS. 20 to 24 are views illustrating a return path of a window cleaning apparatus after cleaning, according to an exemplary embodiment

FIGS. 20 to 24 are views illustrating a return path of a window cleaning apparatus after cleaning, according to an exemplary embodiment Referring to FIG. 20, as illustrated in FIG. 19, when having moved to the left end of the window 400 and finishes cleaning, the first cleaning unit 100 may move up by a predetermined distance H.

For example, the first cleaning unit 100 may move up by the predetermined distance by moving up to the right while making a path similar to a parabola, after finishing cleaning.

When having moved to the right end of the window 400 and finishing cleaning, the first cleaning unit 100 may move up by the predetermined distance H by moving up to the left while making a path similar to a parabola.

The distance H over which the first cleaning unit 100 moves up after cleaning may correspond to a vertical position where a user initially attaches the window cleaning apparatus, and for example, the distance H may correspond to the vertical movement distance H measured by the method described with reference to FIG. 16.

That is, as the first cleaning unit 100 moves up to the vertical initial attachment position H detected when the first cleaning unit 100 is attached, and stays at the position, the user can easily detach the window cleaning apparatus from the window.

Thereafter, the first cleaning unit 100 may move toward the end close to the detected initial attachment position of the window cleaning apparatus, in the left end and the right end of the window 400.

Figure 21:
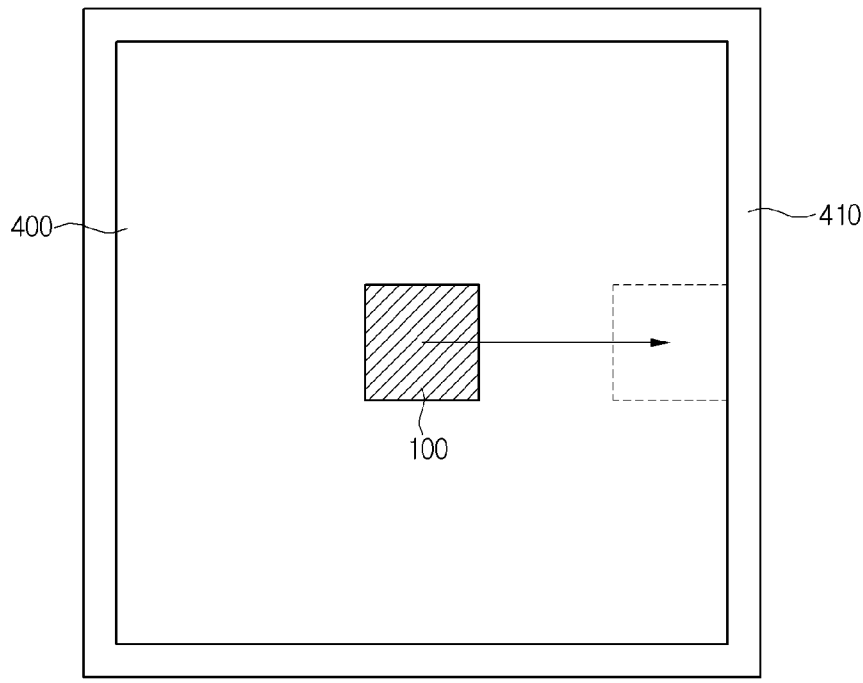

Referring to FIG. 21, when the window cleaning apparatus is attached at the right side on the window, the first cleaning unit may horizontally move right to the left end of the window 400.

Figure 22:
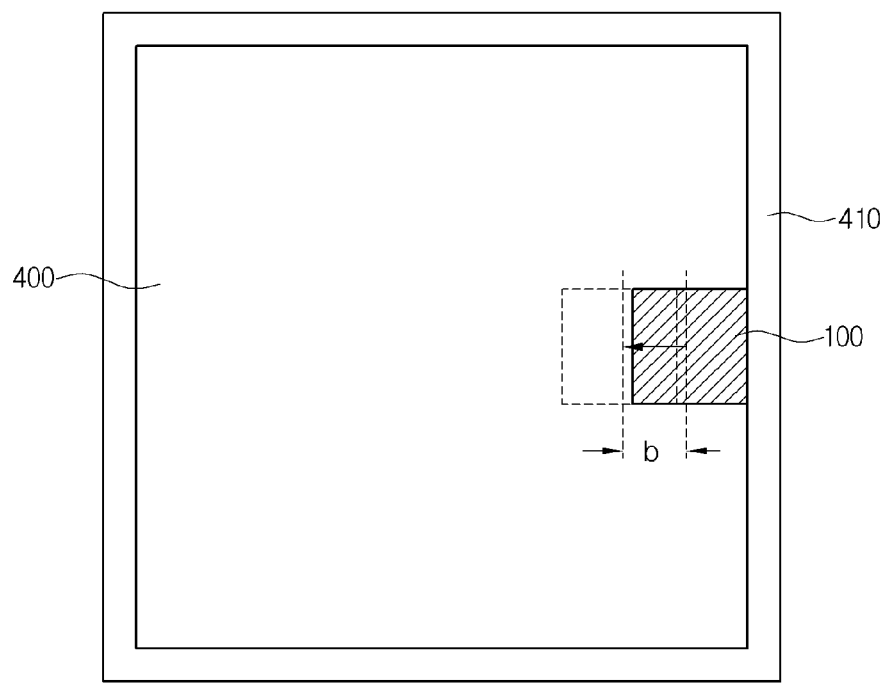

As illustrated in FIG. 22, the first cleaning unit 100 may move in the opposite direction, that is, to the left by a predetermined distance (b), after moving to the right end of the window 400.

As the first cleaning unit 100 stops at the predetermine position (b) from the right end of the window 400 after finishing cleaning, the user can easily detach the window cleaning apparatus. This is because it may be difficult to detach the window cleaning apparatus, when the window cleaning apparatus is in contact with the frame 410.

Figure 23:
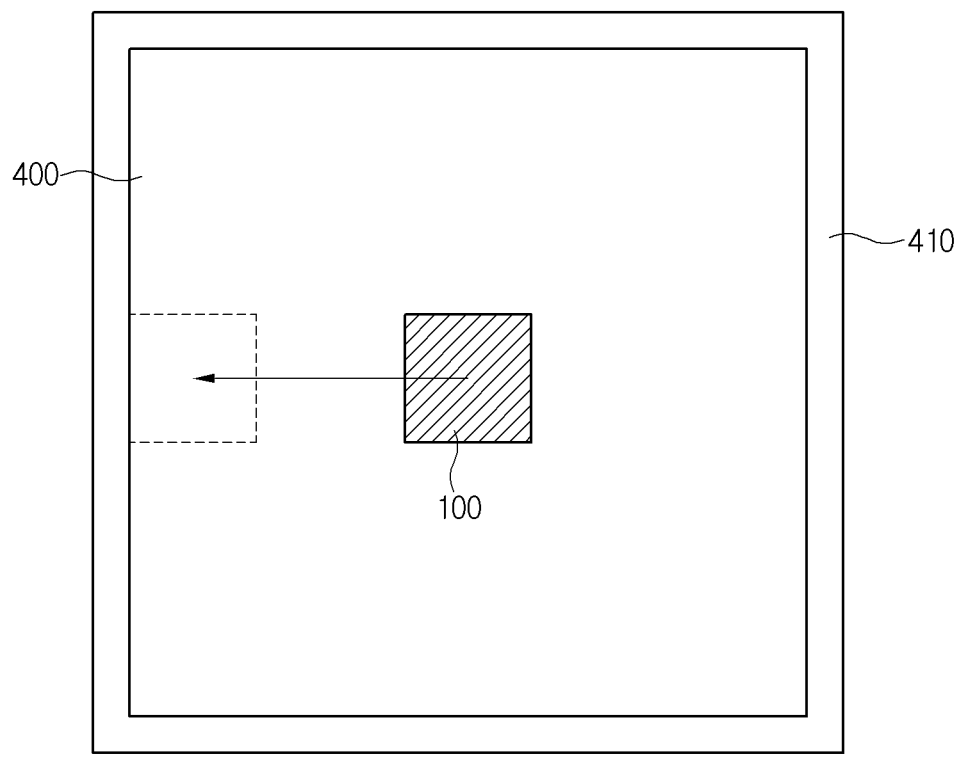

Referring to FIG. 23, when the window cleaning apparatus is attached at the left side on the window, the first cleaning unit may horizontally move left to the left end of the window 400.

Figure 24:
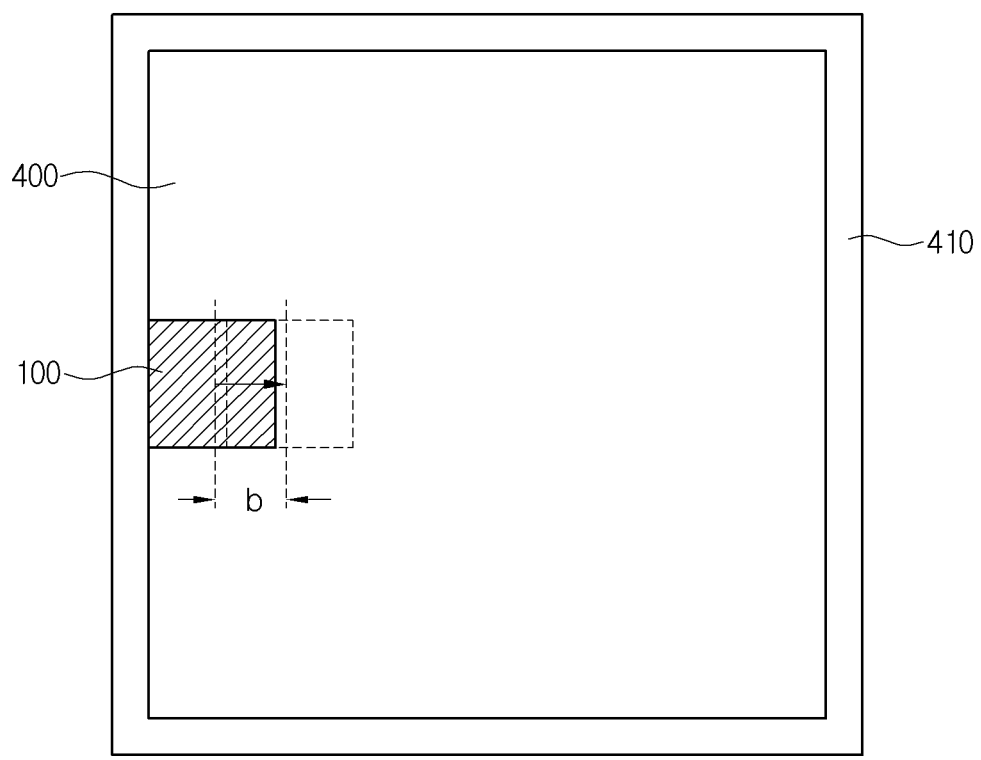

As illustrated in FIG. 24, the first cleaning unit 100 may move in the opposite direction, that is, to the right by a predetermined distance (b), after moving to the left end of the window 400.

According to another exemplary embodiment of the present invention, a method of returning the window cleaning apparatus 10 to the initial attachment position detected when attaching the window cleaning apparatus 10 may be performed, when a battery in the window cleaning apparatus 10 is discharged or the user requires to return the window cleaning apparatus 10, in addition to when finishing cleaning For example, while the window cleaning apparatus 10 operates, the voltage of the batteries in the first cleaning unit 100 and the second cleaning unit 200 is periodically measured, and when the measured voltage of the batteries decreases to a predetermined reference level or less, the window cleaning apparatus 10 can return close to the initial attachment position in accordance with the method described with reference to FIGS. 20 to 24.

Figure 25:
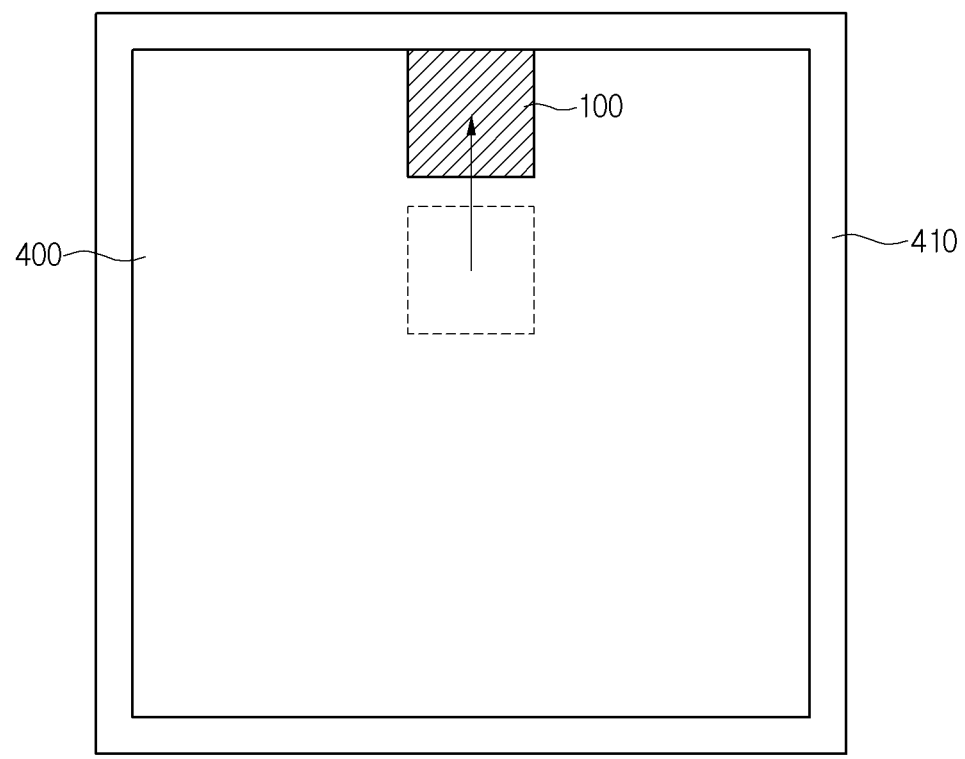
FIGS. 25 and 26 are views illustrating a method of returning a window cleaning apparatus to the initial attachment position from a certain position, according to an exemplary embodiment.
Figure 26:
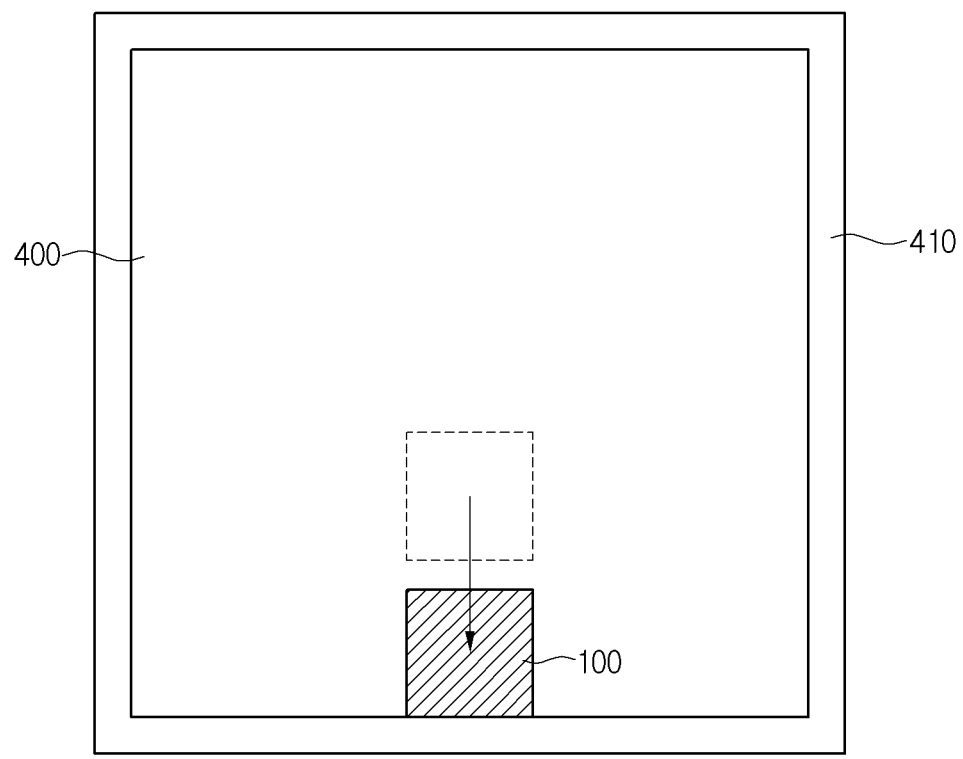

FIGS. 25 and 26 are views showing an exemplary embodiment of a method of returning a window cleaning apparatus from a certain position to the initial attachment position, and the method may be additionally performed to more accurately return the window cleaning apparatus to the initial attachment position.

Referring to FIG. 25, when the voltage of the battery of the window cleaning apparatus 10 decreases to a reference level or less at a certain position while cleaning, the cleaning may be finished and it may be determined whether the present position of the window cleaning apparatus 10 is closer to which one of the top frame and the bottom frame of the window 400.

For example, when the present position of the window cleaning apparatus 10 is closer to the top frame of the window 400, as illustrated in FIG. 25, the window cleaning apparatus 10 vertically moves to the top of the window 400 and the vertical position (for example, the value of Y) of the window cleaning apparatus 10 may be set as the height of the window 400, when the window cleaning apparatus 10 collides with the top frame of the window 400.

Thereafter, the window cleaning apparatus 10 may returns down to the vertical initial attachment position that is detected when the window cleaning apparatus 10 is initially attached, using the value of Y of the window cleaning apparatus 10 which is accurately reset in accordance with the height of the window.

Referring to FIG. 26, when the present position of the window cleaning apparatus 10 is closer to the bottom frame of the window 400, as illustrated in FIG. 25, the window cleaning apparatus 10 vertically moves to the bottom of the window 400 and the vertical position (for example, the value of y)

of the window cleaning apparatus 10 may be set to '0', when the window cleaning apparatus 10 collides with the bottom frame of the window 400.

Thereafter, the window cleaning apparatus 10 may returns up to the vertical initial attachment position that is detected when the window cleaning apparatus 10 is initially attached, using the value of Y of the window cleaning apparatus 10 which is accurately reset in accordance with the height of the window which is accurately reset in accordance with the height of the window.

The user may requires to move the window cleaning apparatus 10 to the initial attachment position at a desired point of time, using a remote control device for controlling the operation of the window cleaning apparatus 10.

Figure 27:
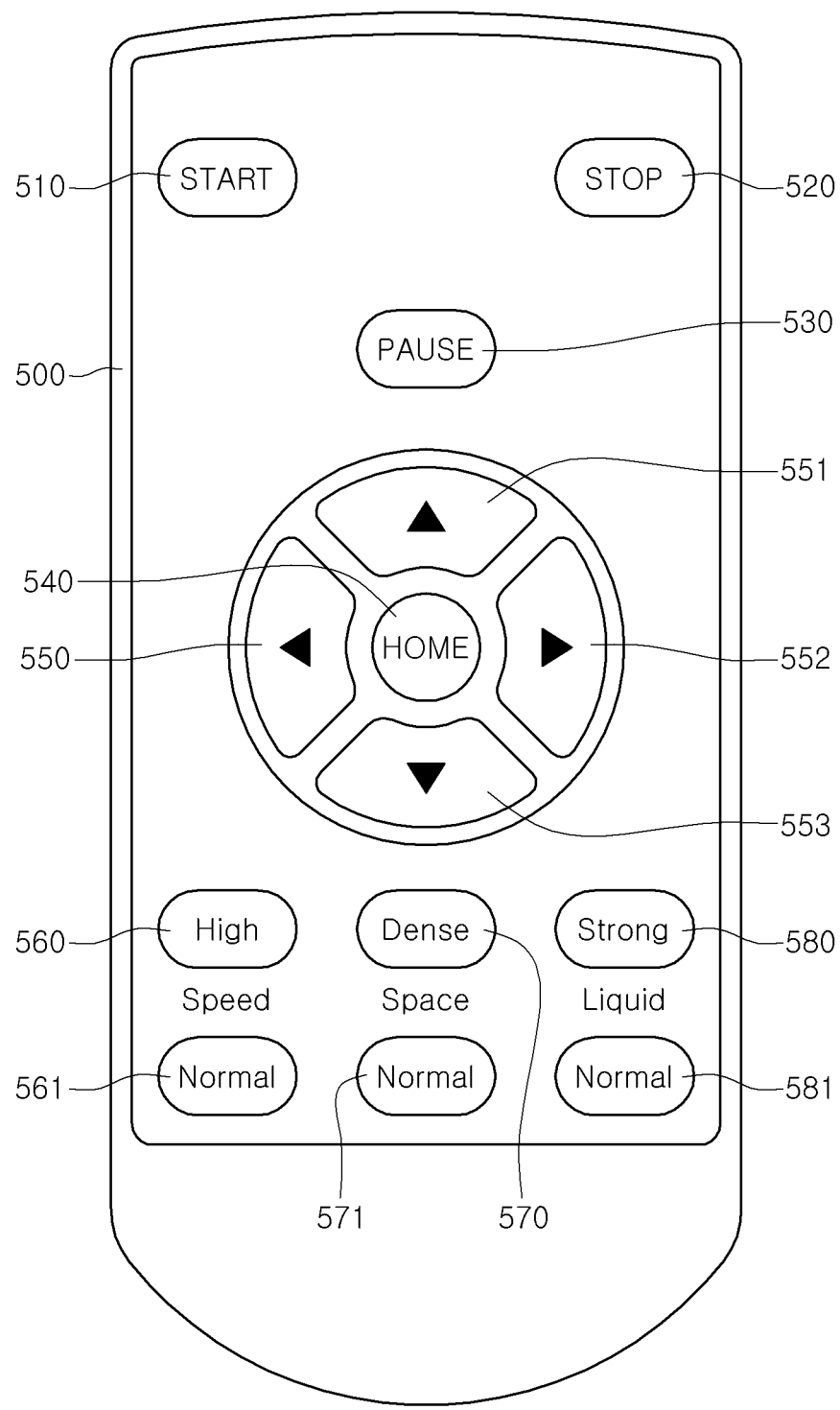
FIG. 27 is a view illustrating the configuration of a remote control device that controls a movement of a window cleaning apparatus, according to an exemplary embodiment.

FIG. 27 is a view illustrating the configuration of a remote control device that controls a movement of a window cleaning apparatus, according to an exemplary embodiment.

Referring to FIG. 27, a user can start the window cleaning apparatus 10 cleans the window 400 by selecting the "START" button 510 of a remote control device 500, after attaching the window cleaning apparatus 10 to the window 400, and to stop of pause the cleaning by selecting the "STOP" button 520 or the "PAUSE" button 530 during the cleaning.

Further, the user can return the window cleaning apparatus 10 to the initial attachment position from the present position by selecting the "HOME" button 540 of the remote control device 500.

Further, the user can manually control the movement direction of the window cleaning apparatus 10, using the direction buttons 550 to 553 of the remote control device 500.

For example, when the user keeps pressing the right button 552 of the remote control device 500, the window cleaning apparatus 10 can move right from the present position until the window cleaning unit 10 collides with the right frame of the window 400.

Further, the user can control the movement speed of the window cleaning apparatus 10, using the speed buttons 560 and 561 of the remote control device 500.

That is, when the user presses the "High" button 560, the movement speed of the window cleaning apparatus 10 increases, and when the user presses the "Normal" button 561, the movement speed of the window cleaning apparatus 10 decreases.

For example, the movement speed of the window cleaning apparatus 10 may be set to a default of 8 cm/sec, the movement speed may be increased by 0.5 cm/sec every time the user presses the "High" button 560, and the maximum adjustable speed may be set to 10 cm/sec.

Further, the movement speed may decrease by 0.5 cm/sec, every time the user presses the "Normal" button 561, and the minimum adjustable speed may be set to 6 cm/sec.

Further, the user can control the cleaning gap of the window cleaning apparatus 10, using the gap buttons 570 and 571 of the remote control device 500.

That is, when the user presses the "Dense" button 570, the cleaning gap of the window cleaning apparatus 10 may decrease, and when the user presses the "Normal" button 571, the cleaning gap of the window cleaning apparatus 10 may increase.

For example, the movement angle of the window cleaning apparatus 10 may decrease by 0.5° and the cleaning gap may decrease, every time the user presses the "Dense" button 570, in which the maximum adjustable angle may be set to 3°.

Further, the movement angle may increase by 0.5°, every time the user presses the "Normal" button 571, and the minimum adjustable angle may be set to −3°.

Further, the user can control the amount of detergent ejected from the window cleaning apparatus 10, using the ejection buttons 580 and 581 of the remote control device 500.

That is, when the user presses the "Strong" button 580, the detergent ejection interval of the window cleaning apparatus 10 may decrease, and when the user presses the "Normal" button 581, the detergent ejection interval may increase.

For example, the window cleaning apparatus 10 may be basically set to eject a detergent for 60 msec at an interval of 4.8 sec and the detergent ejection interval of the window cleaning apparatus 10 may decrease by 1 sec, every time the user presses the "Strong" button 580, such that more detergent may be ejected.

On the other hand, when the user presses the "Normal" button 581, the detergent ejection time may decrease from 60 msec to 20 msec.

Although the method of controlling the movement of the window cleaning apparatus including the first and second cleaning units 100 and 200 respectively attached on the inner and outer sides of the window by the magnetic force is described as an example, the present invention is not limited thereto, and for example, the method may be applied to a window cleaning apparatus which is attached to one of the inner and outer sides of the window 400 or a window cleaning apparatus attached to the window 400 by vacuum absorption, not the magnetic force.

Further, the method for controlling the window cleaning apparatus according to the exemplary embodiments may be programmed to be executed in a computer and stored in a computer-readable recording medium such as a ROM, a RAM, a CD-ROM, a magnetic tape, a floppy disk, an optical data storage device, and a carrier wave (such as data transmission through the Internet).

The computer-readable recording mediums may be distributed to a computer system that is connected through a network and may store and execute computer-readable codes in the type of distribution. Further, functional programs, codes, and code segments for implementing the control method may be easily inferred by programmers in the art.

Although the present invention was described above with reference to the exemplary embodiments, the exemplary embodiments are only examples and do not limit the present invention, and those skilled in the art would know that the present invention may be changed and modified in various ways not exemplified above without departing from the scope of the present invention.

For example, the components described in detail in the exemplary embodiments of the present invention may be modified. Further, differences relating to the changes and modifications should be construed as being included in the scope of the present invention which is determined by claims.

What is claimed is:

1. A method of controlling a movement of a window cleaning apparatus that is attached and moved on a window, the method comprising:

detecting, by a control device, an initial attachment position of the window cleaning apparatus, the detecting comprising determining whether the initial attachment position is positioned on a first side of the window or a second side opposite to the first side of the window; and moving, by the control device, the window cleaning apparatus to a detachment position after completion of the cleaning the window, the detachment position being provided at one of an end of the first side and an end of the second side of the window corresponding to the detected initial attachment position, wherein the detecting the initial attachment position comprises:
  moving the window cleaning apparatus vertically from the initial attachment position to a first position, the first position corresponding to a top end of the window;
  moving the window cleaning apparatus horizontally at the top end of the window from the first position to a second position by a first distance, the second position corresponding to the end of the first side of the window;
  moving the window cleaning apparatus horizontally from the second position to a third position by a second distance, the third position corresponding to the end of the second side at the top end of the window; and
  determining the initial attachment position based on a result of comparing the first and second distances.

2. The method of claim 1, wherein the determining the attachment position comprises determining that the initial attachment position is at the second side on the window if the first distance is larger than a half of the second distance.

3. The method of claim 1, wherein the determining the attachment position comprises determining that the initial attachment position is at the first side on the window if the first distance is smaller than a half of the second distance.

4. The method of claim 1, wherein the detecting the initial attachment position further comprises estimating the initial attachment position of the window cleaning apparatus as being positioned at one of the first side and the second side, in accordance with a direction in which the window cleaning apparatus is attached to the window.

5. The method of claim 4, wherein the detecting the initial attachment position further comprises:
  moving the window cleaning apparatus in a direction corresponding to the estimated initial attachment position;
  ascertaining whether the window cleaning apparatus collides with the frame of the window, within a predetermined distance;
  determining the initial attachment position of the window cleaning apparatus being the estimated position if the window cleaning apparatus collides with the frame of the window within the predetermined distance; and
  determining that the initial attachment position of the window cleaning apparatus being the opposite to the estimated position if the window cleaning apparatus does not collide with the frame of the window, within the predetermined distance.

6. The method of claim 1, wherein detecting the initial attachment position comprises determining the initial attachment position with respect to a vertical direction of the window cleaning apparatus by moving the window cleaning apparatus to the top end of the window,
  wherein the predetermined distance corresponds to the determined initial attachment position with respect to the vertical direction.

7. The method of claim 1, wherein the moving the window cleaning apparatus comprises moving the window cleaning apparatus, which has moved to the end of the first side or the end of the second side of the window corresponding to the detected initial attachment position, by a predetermined distance in the horizontal direction and in an opposite direction of moving to the end of the first side or the end of the second side, respectively to the detachment position.

8. The method of claim 1, further comprising moving the window cleaning apparatus towards the detected initial attachment position if the voltage of a battery in the window cleaning apparatus decreases to a reference level or less.

9. The method of claim 1, further comprising moving the window cleaning apparatus towards the detected initial attachment position if a user requires the window cleaning apparatus to return to the initial attachment position with a remote control device.

10. The method of claim 1, further comprising resetting a direction offset of a direction sensor configured to sense a movement direction of the window cleaning apparatus if the window cleaning apparatus collides with the frame of the window.

11. The method of claim 1 further comprising:
  moving, by the control device, the window cleaning apparatus to one of a second end and a first end at a bottom end of the window; and
  moving the window cleaning apparatus horizontally from the one of the second end and the first end at the bottom end to the other of the second end and the first end at the bottom end to remove detergent ejected from the window cleaning apparatus.

12. A method of controlling a movement of a window cleaning apparatus that is attached and moved on a window, the method comprising:
  detecting, by a control device, an initial attachment position of the window cleaning apparatus, the detecting comprising determining whether the initial attachment position is positioned on a first side of the window or a second side opposite to the side side of the window; and
  moving, by the control device, the window cleaning apparatus to a detachment position after completion of the cleaning the window, the detachment position being provided at one of an end of the first side and an end of the second side of the window corresponding to the detected initial attachment position, wherein the detecting the initial attachment position comprises:
  moving the window cleaning apparatus horizontally from the initial attachment position to the end of the second side of the window by a third distance;
  moving the window cleaning apparatus vertically to a top end of the window after moving the window cleaning apparatus to the end of the second side of the window;
  moving the window cleaning apparatus horizontally at the top end toward the end of the first side from the end of the second side of the window by a fourth distance; and
  determining that the initial attachment position is at the first side on the window, if the third distance is larger than a half of the fourth distance.

13. The method of claim 12 further comprising:
  moving, by the control device, the window cleaning apparatus to one of a second end and a first end of a bottom end of the window; and
  moving the window cleaning apparatus horizontally from the one of the second end and the first end at the bottom end to the other of the second end and the first end at the bottom end to remove detergent ejected from the window cleaning apparatus.

14. A window cleaning apparatus that is attached and moved on a window, the window cleaning apparatus comprising:
  a first cleaning unit; and
  a second cleaning unit, the first and second cleaning unit being respectively attached to an inner side and an outer side of a window by a magnetic force and configured to move on the window,
  wherein at least one of the first and second cleaning units comprises a control unit configured to detect an initial attachment position of one of the first and second cleaning units, configured to determine whether the initial attachment position is positioned on a first side of the window or a second side opposite to the first side of the window and configured to move the window cleaning apparatus to a detachment position, the detachment position being provided at one of an end of the first side and an end of the second side of the window in the horizontal direction corresponding to the detected initial attachment position, after completion of cleaning the window, wherein the control unit is configured to detect the initial attachment position of the one of the first and second cleaning units by controlling the one of the first and second cleaning units to move vertically from the initial attachment position to a first position, the first position corresponding to a top end of the window to move the window cleaning apparatus horizontally at the top end of the window from the first position to a second position by a first distance, the second position corresponding to the end of the first side of the window, to move the window cleaning apparatus horizontally from the second position to a third position by a second distance, the third position corresponding to the end of the second side at the top end of the window and to determine the initial attachment position based on a result of comparison between the first and second distances.

15. The window cleaning apparatus according to claim 14, wherein the control unit is disposed in one of the first and second cleaning units, the one attached to an inner side of the window and is configured to control movement of one of the first and second cleaning units, and the other of the first and second cleaning units is moved by a magnetic force according to the movement of the one of the first and second cleaning units.

16. The window cleaning apparatus according to claim 14, wherein the controller is configured to control the one of the first and second cleaning units to move to one of a second end and a first end of a bottom end of the window; and the controller is configured to control the one of the first and second cleaning units to move horizontally from the one of the second end and the first end at the bottom end to the other of the second end and the first end of the bottom end to remove detergent ejected from one of the first and second cleaning units.

\* \* \* \* \*